(12) United States Patent
Watanabe et al.

(10) Patent No.: US 6,763,458 B1
(45) Date of Patent: Jul. 13, 2004

(54) SYSTEM AND METHOD FOR INSTALLING AND SERVICING AN OPERATING SYSTEM IN A COMPUTER OR INFORMATION APPLIANCE

(75) Inventors: Ryoji Watanabe, Cupertino, CA (US); Henry T. Fung, San Jose, CA (US); Paul D. Schwartz, Boulder Creek, CA (US)

(73) Assignee: Captaris, Inc., Bellevue, WA (US)

( * ) Notice: Subject to any disclaimer, the term of this patent is extended or adjusted under 35 U.S.C. 154(b) by 0 days.

(21) Appl. No.: 09/556,113

(22) Filed: Apr. 21, 2000

Related U.S. Application Data

(63) Continuation-in-part of application No. 09/406,048, filed on Sep. 27, 1999.

(51) Int. Cl.⁷ .............................................. G06F 15/177
(52) U.S. Cl. ......................................... 713/100; 713/2
(58) Field of Search ............................... 713/1, 2, 100; 714/2, 15; 717/168–178

(56) References Cited

U.S. PATENT DOCUMENTS

| | | | | |
|---|---|---|---|---|
| 4,723,269 | A | | 2/1988 | Summerlin .................. 379/102 |
| 5,136,711 | A | | 8/1992 | Hugard et al. .............. 395/700 |
| 5,410,706 | A | | 4/1995 | Farrand et al. ............. 395/700 |
| 5,410,707 | A | * | 4/1995 | Bell .............................. 713/2 |
| 5,414,848 | A | | 5/1995 | Sandage et al. ............ 395/650 |
| 5,426,775 | A | | 6/1995 | Boccon-Gibod ............ 395/575 |
| 5,469,573 | A | * | 11/1995 | McGill, III et al. ........ 717/127 |

(List continued on next page.)

OTHER PUBLICATIONS

"IT Week: Red hat offers tools for appliance development" (Vaughan–Nichols; downloaded Feb. 22, 2000 from http://www.zdnet.co.uk/news/2000/4/ns–13145.html; 1p.).

"Embedded Linux–based software solutions" (Lineo Embedix; downloaded Feb. 22, 2000 from http://www.lineo.com/products/embedix.html; 3pp.).

"Dr. DOS. The compact Y2K DOS for embedded or thin–client solutions" (Lineo DrDOS; downloaded Feb. 22, 2000 from http://www.lineo.com/products/drdos.html; 2 pp.).

(List continued on next page.)

*Primary Examiner*—Dennis M. Butler
(74) *Attorney, Agent, or Firm*—Perkins Coie LLP

(57) ABSTRACT

The invention provides apparatus, computer program, and method for multiple operating system support and a fast startup capability in a computer or information appliance. It permits execution of one of a plurality of available operating systems at the time of powering on the device and where data generated within one of the plurality of operating systems is available to a different application program executing within a different operating system on the same device. Provides for unattended file transfers and appliance mode operation for playing back digital audio without the overhead associated with conventional systems. Permit various microprocessor based systems to operate efficiently and with lower overhead. In one aspect, the invention provides a device, such as a computer or information appliance, including a processor and memory coupled to the processor; a storage system coupled to the processor and storing a portion of a first operating system in a first storage region and a portion of a second operating system in a second storage region; the storage system further providing read/write compatible storage and retrieval of data for first and second application programs executing in each of the first operating system and the second operating system respectively; and a boot controller responsive to receipt of a boot control indicator when the processor initiates a boot to an operational state to control booting or the processor into a selected one of the first operating system and the second operating system. Method, computer program, and computer program product are also provided.

77 Claims, 15 Drawing Sheets

U.S. PATENT DOCUMENTS

| | | | | |
|---|---|---|---|---|
| 5,519,843 | A | | 5/1996 | Moran et al. ................ 395/430 |
| 5,701,477 | A | | 12/1997 | Chejlava, Jr. ............... 395/652 |
| 5,715,462 | A | * | 2/1998 | Iwamoto et al. ............. 717/173 |
| 5,809,118 | A | | 9/1998 | Carmello et al. ...... 379/102.02 |
| 5,832,214 | A | * | 11/1998 | Kikinis ........................ 713/202 |
| 5,832,283 | A | | 11/1998 | Chou et al. ............ 395/750.01 |
| 5,856,789 | A | | 1/1999 | Huang .................... 340/825.72 |
| 5,860,001 | A | * | 1/1999 | Cromer et al. .................. 713/1 |
| 5,864,698 | A | | 1/1999 | Krau et al. .................. 395/652 |
| 5,867,676 | A | | 2/1999 | Nguyen et al. ............. 395/309 |
| 5,878,264 | A | | 3/1999 | Ebrahim ................ 395/750.05 |
| 5,887,163 | A | | 3/1999 | Nguyen et al. ............. 395/652 |
| 5,968,116 | A | | 10/1999 | Day, II et al. .............. 709/202 |
| 6,011,473 | A | | 1/2000 | Klein ......................... 340/571 |
| 6,178,503 | B1 | * | 1/2001 | Madden et al. ................. 713/2 |
| 6,272,611 | B1 | * | 8/2001 | Wu ............................. 711/173 |

OTHER PUBLICATIONS

"Microwindows and NanoG" (Greg Haerr's Microwindows and NanoGUI Page, downloaded Feb. 23, 2000 from http://microwindows.censoft.com; 13 pp.).

"Linux for Handheld computers" (Linux CE; downloaded Feb. 23, 2000 from http://www.linuxce.org; 2 pp.).

"PC Intern, The encyclopedia of system programming" (Tischer, et al.; Abacus, Grand Rapids, MI, 1996; pp. 355–358).

"XML representation of a relational database" (downloaded Feb. 24, 2000 from http://www.w3.org/XML/RDB.html 8 pp.).

* cited by examiner

AN AGENT PROGRAM RUNS IN WIN32 TO PREPARE INFORMATION
FOR AVAILABLE IN FIRSTPAGE MODE.

THE OEMs PC IS MADE TO COLD-BOOT INTO THE DEDICATED ENVIRONMENT TO RUN A PROGRAM THAT DOWNLOADS CRITICAL INFORMATION. IT IS CACHED IN THE FAT PARTITION.

AN AGENT PROGRAM RUNS IN WIN32 TO PREPARE INFORMATION
FOR AVAILABLE IN FIRSTPAGE OR APPLIANCE MODE.

ON A LATER FIRSTPAGE OR APPLIANCE MODE BOOT,
IT IS AVAILABLE FOR VIEWING.

THE OEMs PC IS MADE TO COLD-BOOT INTO THE DEDICATED ENVIRONMENT TO RUN A PROGRAM THAT DOWNLOADS CRITICAL INFORMATION. IT IS CACHED IN THE FAT PARTITION.

THE INFORMATION IS THUS AVAILABLE IN THE NORMAL WORKING MODE OF THE PC, EVEN IF IT IS LATER NOT CONNECTED TO THE INTERNET

SYSTEM AND METHOD FOR INSTALLING AND SERVICING AN OPERATING SYSTEM IN A COMPUTER OR INFORMATION APPLIANCE

RELATED APPLICATIONS

This application is a continuation-in-part of U.S. Utility patent application Ser. No. 09/406,048 filed 27 Sep. 1999 for System And Method For Achieving Rapid Operating State of an Application Program in a General Purpose Computer Device, and which application is hereby incorporated by reference in its entirety. U.S. Utility patent application Ser. No. 07/556,114 filed 21 Apr. 2000 entitled Apparatus and Method for Information Appliance Having Simultaneous Multiple Operating System Support Including Fast Start Appliance Mode and Full System Standard Mode, is also a Continuation-In-Part of U.S. Utility patent application Ser. No. 09/406,048 and is also hereby incorporated by reference.

FIELD OF INVENTION

This invention pertains generally to apparatus, system, and method that provide multiple operating system support and a fast or task-specific startup capability in a computer or information appliance device, and more particularly to apparatus, system, and method that permits a user to select and execute one of a plurality of operating systems available on the device at the time of powering on the device and where data generated by an application program executing within one of the plurality of operating systems is available to a different application program executing within a different operating system on the same device.

BACKGROUND

Today's modem personal computers typically includes a microprocessor, a memory system, data storage devices, and input/output (I/O) devices such as monitor or display, keyboard, pointing devices such as mouse, touch-screen, or other pointing device, and communication devices, among others. The computer system is typically initialized, or boot-strapped ("booted"), during or immediately after a power-up or reset initiated sequence using system software and/or information representing a sequence of internal control variables which is usually stored, at least in part, within a system read-only-memory (ROM). The ROM in which this information is stored is generally referred to as the BIOS which is an acronym for Basic Input/Output System, as this information provides some fundamental information to the processor as to how to the processor relates to inputs from and outputs to its environment. Since the system ROM is desirably non-volatile, the contents of the ROM contains valid data and/or instructions so that the computer system can be reliably boot-strapped to a point where the operating system of the computer can be loaded to complete the boot-up sequence. Normally, an operating system is required before other programs referred to as "applications programs" can be loaded and executed.

One computer system using the ROM-based boot code approach is the type of computer referred to as an IBM personal computer (PC) and variants referred to as IBM PC compatibles, PC clones, or simply IBM or PC compatibles. Another type of computer is the Macintosh line of computers, including the iMac, and variants thereof made by Apple Computer, Inc. of Cupertino Calif. Increasingly, computers are available in a variety of form factors such as main-frame models, desk top models, notebook models, lap top models, sub-notebook models, Personal Data Assistants (PDA), Personal Information Manager (PIM), and the like. In addition, many computers, information appliances, and other electronic devices have the equivalent of a start-up or boot-sequence requirement and capability. We focus this discussion on the IBM PC because of its large market share and because it is representative of a large class of computers, information appliances, and other devices which suffer from the limitations of conventional structure and methods, and which may benefit from the invention which is described in detail elsewhere in this specification; however, those workers having ordinary skill in the art will appreciate that the invention pertains to all such computers.

In an IBM PC or an IBM compatible PC system, the system ROM stores the Basic Input/Output System (BIOS) which is executed upon power-up by the processor, microprocessor, or CPU to initialize the computer system. Initialization typically involves first performing a Power On Self-Test (POST) routine, and then providing certain low-level, hardware dependent support for the system display or monitor, floppy disk drive(s), hard disk drive(s), communication devices, and other devices that may be present on the computer. More sophisticated routines and data may be included in the system ROM depending upon the needs and complexity of a given computer system. As the level of sophistication of computer systems and information appliances increases, the routines and data stored in the ROM are updated to match the needs of the computer system and its suite of devices. Additional details of the boot-up procedures for exemplary operating systems are described hereinafter.

All or virtually all computers, such as the various models of personal computers (PCs) produced by IBM Corporation, execute "operating system software" that instructs the computer how to use other programs, termed "application software", "application programs", or the like, such as word processing programs, spreadsheet programs, data base programs, and information management programs. Examples of PC operating systems include MS-DOS, PC-DOS, OS/2, Microsoft Windows 2.x, Microsoft Windows 3.x, Windows 95, Windows 98, Windows 2000, Windows NT 4.0, UNIX, and Linux, to name a few examples.

Before a PC can run an operating system, it must load the operating system from a floppy disk, a hard disk drive, or other storage medium to the PC's working memory (which is ordinarily random access semiconductor memory or RAM), in addition to loading the BIOS. This is carried out through a process known as boot-strapping, or more simply, booting the PC.

"Booting" refers to the process that occurs when a powered-off PC is first started (called a "cold boot"), or for an already-powered on PC when a "restart" command is issued to the computer through its operating system interface or when the user hits a hardware restart button (the latter cases being called a "warm boot"). All cases which we will call booting is typically characterized by the resetting of most of the PC's volatile memory state to a starting state followed by the loading and initialization of the operating system session.

Modem PC systems also support halting of usage with one or more "sleep" states where the memory state of usage session is preserved while the CPU is halted and the system is placed in a low power consumption state. The hardware of a system in such a suspended state typically cannot be used for purposes other than the suspended session because state changes in the system would conflict with assumptions of the suspended state. Booting is different from the suspend/ resume states, therefore, we make a distinction between booting and sleep-related processes. Additional information is available in "Instantly Available Power Managed Desktop PC Design Guide," Version 1.2, published by Intel Corporation 25 Sep. 1998, and available on the world-wide-web as of 04 April 2000 at the address http://developer.intel.com/technology/iapc/downloads/IAPCDGrev1_2. pdf, which document is herein incorporated by reference.

We now describe the nominal boot-strapping or boot procedure under Windows 98 so as to establish a background of information and terminology as to how the inventive structure and procedure operates in conjunction with this procedure; however, the discussion of DOS, Windows 1 .x, Windows 2.x, Windows 3.x, Windows CE, Windows 95, Windows 98, or Windows 2000, and/or of the operation of the invention relative to these operating environments or systems is merely exemplary and not limiting.

By way of overview, after power-on, Microsoft Windows 98 boots in roughly four stages: (1) Loading and initializing the BIOS, (2) Loading real-mode drivers and Terminate and Stay Resident (TSR) programs for backward compatibility with DOS, (3) Loading and initializing Windows specific device drivers (static VxDs) in real mode, and (4) Loading and starting up the protected-mode operating system and loading any remaining VxDs. The details of these Windows 98 boot stages, as well as the start up and booting of other Microsoft Windows operating system versions and non-Microsoft operating systems are known in the art not described in detail here. The interested reader is referred to numerous publications published by Microsoft Corporation and Microsoft press and others. For example, "Expert Guide to Windows 98", Mark Minasi, Eric Christiansen, and Kristina Shapar, 1998, Sybex, 1151 Marina Village Parkway, Alameda, Calif. 94501; describes Microsoft Windows 98 throughout (pp. 1–899) and the Windows 98 startup and boot operations (pp. 544–577), and is hereby incorporated by reference.

It may readily be appreciated that the Windows 3.x, Windows NT, Windows 95, Windows 98, Windows 2000, Windows 2000 Professional, Microsoft Millennium Edition, Windows NT 2000, as well as other WIN32-based operating systems, UNIX, Apple Macintosh System 8, and undoubtedly future modifications, updates, and enhancements to the these operating systems and environments require considerable time to complete each of the steps involved with their respective startup or boot procedures. Each provides a wealth of features, capabilities, and options within the operating system and further provides means for adding functionality provided by compatible third-party software and hardware manufacturers. By comparison, a minimal operating system of some type not having the sophisticated features, capabilities, options, and compatibilities running on the same computer or information appliance, or not all available features activated, might be expected to complete startup or boot operation in considerably less time and more reliability and deterministically. Besides speed and reliability, a complex system has a problem in that there are more interacting components which could raise issues during the boot process and which might interfere with unattended boot operation (described elsewhere in this specification). For example, a dialog box requiring a user input may unexpectedly appear during a boot operation that would halt the boot until a response were provided.

For example, the so called "Disk Operating System" (DOS), versions of which have been released by Microsoft Corporation, IBM, and others, have a reduced set of capabilities as compared to the newer and more sophisticated operating systems (OS) described above, and a radically faster startup or boot time. Empirical data suggest that this difference may be at least about five times greater for a Microsoft Windows 98 boot than for a DOS boot on the same computer hardware, and probably considerably more. Like DOS, other operating systems that provide a more limited predetermined set of capabilities may also be expected to boot in considerably less time than the time required for the exemplary Windows 98 operating system.

As a further point of comparison, several popular portable personal information managers (PIMs) or personal data managers (PDAs) known as the Palm OS based devices (for example, Palm III, Palm IV, and Palm V, Palm VII) as well as the Microsoft Windows CE based devices (for example, Clio made by Vadem, Cassiopia made by Casio, and the like) provide a virtually instant on capability, wherein the elapsed period of time between pressing the "on" or "power" button and the ability to access or otherwise query the device is a couple of seconds. It is noted that in most of these devices electrical operating power is not actually switched ON or OFF in spite of the suggestion on the "power" button, rather the toggle of the ON/OFF button causes the system to transition from a dormant state or sleep mode to an active state, and pressing the "on/off" button merely sends an interrupt to the processor to alter its operating state.

In both the Palm OS based systems and the Windows CE based systems, such as for example in the Clio computing system (made by VADEM of San Jose, Calif.), each of the Windows CE operating system as well as application programs are stored in fast solid state ROM (or flash RAM) and loaded into system RAM for execution by the processor virtually instantaneously so that the user is not aware of any significant delay. In general the delay between pressing the on/off button and the appearance of a screen display or acceptance of a user command will be on the order of from one to a couple of seconds.

Windows 95, 98, 2000 and similar operating system based computing systems are capable of being placed in a suspend state in which they appear to be off and consume less power than when in an active state; and wherein the time to transition back to an active state is less than the time to perform a cold boot, unfortunately, this type of suspend/sleep to active mode transition is not completely satisfactory for applications such as personal information manager applications (PIM) because data remains in memory and the memory continues to consume power and there is risk that data will be lost if battery power runs low while in the suspend/sleep state. In any event the time to transition from the suspend/sleep state to active state is still quite long.

While these Palm size devices and sub-notebook computers operating under the Palm operating System or the Windows CE operating system are useful, many users desire the features which are only available on a Windows 95, 98, 2000, NT, UNIX, Linux, Apple Macintosh Operating System 8, or other general-purpose computing machines for which a full suite of user application programs is available. At this time, the Palm size and sub notebook computing machines which provide for virtually instant on operation have the useful but limited set of applications and do not provide the full suite of application programs or hardware peripheral connectivity desired by users. The user has heretofore been forced to choose between the "instant-on" or "fast-start" capability of computing machines or information appliances having limited applications and those having virtually unlimited applications but consuming a much longer period time for the desired application and its associated data to become available after the user has toggled the ON/OFF button.

While a delay may be tolerable for some applications such as a graphical or pictorial drawing application program, a sophisticated word processing application program, or other application program where the user will spend the considerable percentage of time interacting with that program and where the delay encountered in booting the operating system and loading the application program represents a minor percentage of the total time involved with the task, such a delay may not be tolerable when the period of delay approaches the time need to interact and complete the task. For example, a business traveler may desire to access a particular telephone number from a phone book within their personal information manager so that they may telephone a customer or colleague before boarding an aircraft. The time required to look up the telephone number once the computer is operable may be only a matter of a few seconds; however, the time required to boot the Windows 98 based general personal computer may well exceed two or more minutes. Under these circumstances the user is dissuaded from looking up the telephone number or making the telephone call. Another example is a situation where the user would like to enter a note in a notepad type application, but, rather than booting the Windows 98 operating system based machine to launch a word processing or other notepad application instead chooses to rely on memory or jot the note on a sheet of paper, taking a risk that either the intended remark will be forgotten or that the physical paper is lost, forgotten, or misplaced.

Therefore there remains a need for an "instant-on" or "rapid-on" and fast application program load and execution capability for certain application programs including calendar, phone book, e-mail reference, notepad, internet content access, email access, and other applications, comparable to that provided with certain palm size, hand-held, and sub-notebook computers running under Windows CE OS, Palm OS, or other ROM based operating systems, in a general-purpose full operating system (Microsoft Windows, Unix, and the like operating system) personal computer, so that users of the general purpose computer will have the vast array of application programs available for such general purpose computers as well as rapid access to one or more particular application programs.

There also remains a need for a computer system or information appliance that can be turned off and yet boot to a state where it can upload or download information from a remote location, such as server on the Internet. In this way information can be sent or received from the computer when available even though the machine is unattended.

There is also a need to permit such unattended data or content upload or download while presenting minimum security exposure to parts of the system not directly involved with the content upload or download.

There is also a need for a universal information appliance that satisfies the needs of a computer user by providing a single information appliance having a full suite of sophisticated programmatic features yet provides fast access to at least a subset of commonly used application programs (such as an email and personal information manager) and audio entertainment operability for times when the user is between work tasks.

In some traditional dual-boot systems and methods, such methods focus on providing a capability to boot from more than one alternative operating system, or the ability to alter an existing single boot system into a dual-boot system after the first booting system has already been installed on the computer. In any event, such systems do not provide the multiple simultaneous operating system support where there is a shared logical storage region where application programs may write data and intercommunicate in the manner provided by the present invention.

Therefore there remains a need for device, system, method, computer program, and operating model that overcome the limitations of conventional computer systems and information appliances.

SUMMARY

Figure 1:
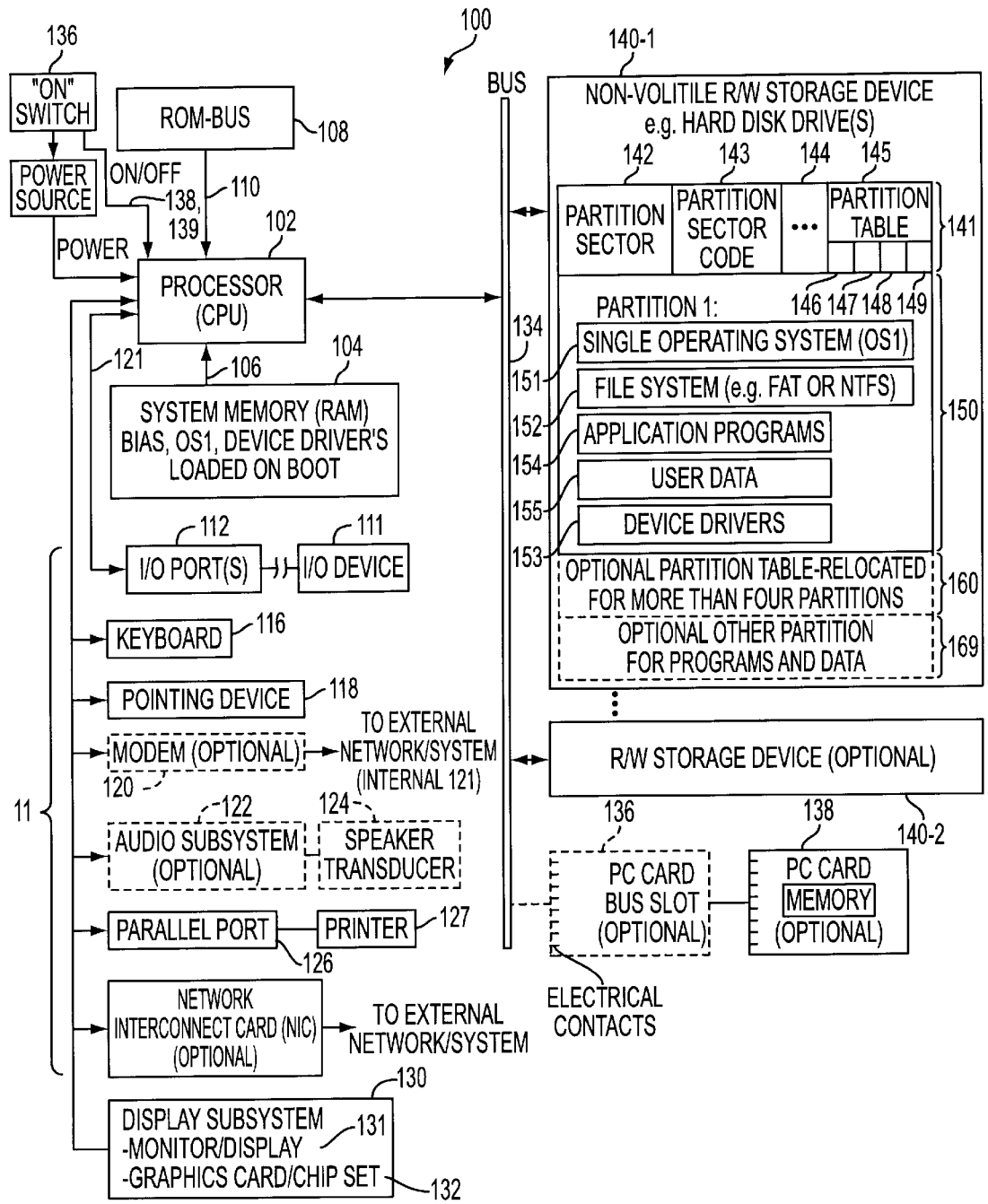
FIG. 1 is a diagrammatic illustration showing an embodiment of a typical conventional computer system which may be adapted for use with one embodiment of the inventive structure and method.

The invention provides apparatus, system, computer program, and method that provide multiple operating system support and a fast startup capability in a computer or information appliance device. More particularly it permits a user to select and execute one of a plurality of alternative operating systems available on the device at the time of powering on the device and where data generated by an application program executing within one of the plurality of operating systems is available to a different application program executing within a different operating system on the same device. Using these structures and methods, the invention provides for unattended file transfers even when the device starts off in a powered off state, provides appliance mode operation for playing back digital audio (music) without the overhead associated with conventional computer systems. More generally, the inventive structure and method permit various microprocessor based systems to operate very efficiently and with lower overhead than conventional systems.

In one embodiment, the invention provides a device, such as a computer or information appliance, comprising: a processor and high-speed random access memory coupled to the processor; a storage system coupled for communication to the processor and storing at least a portion of a first operating system in a first storage region and at least a portion of a second operating system in a second storage region; the storage system further providing read/write compatible storage and retrieval of data for first and second application programs executing in each of the first operating system and the second operating system respectively; and a boot control circuit responsive to receipt of a boot control indicator when the processor initiates a boot to an operational state to control booting or the processor into a selected one of the first operating system and the second operating system. In one embodiment, the region providing read/write compatible storage and retrieval of data for first and second application programs is selected from at least one of the first and second storage regions. In another embodiment, the storage system further comprises a third storage region, and the third region providing read/write compatible storage and retrieval of data for first and second application programs. In another embodiment, the boot control signal comprises an electrical signal received from an external signal source; whereas in yet another embodiment, the boot control signal comprises a state of a bit stored in a bit storage location within the information appliance.

The invention also provides a method of operating a device of the type having a processor and a random access memory coupled to the processor, where the processor loads code or other instructions from a storage system and executes the instructions, the code including selected operating system code; the method comprising: storing at least a portion of a first operating system in a first storage region of the storage system and at least a portion of a second operating system in a second storage region of the storage system; providing a read/write compatible storage and retrieval format for reading and writing data for first and second application programs executing in each of the first operating system and the second operating system respectively; receiving a boot control indicator prior to booting the device that selects one of the first and second operating systems to boot; and controlling which operating system code from among the first and second operating systems is loading when the processor is booted in response to the received boot control indicator. In one embodiment of this method, the region provides read/write compatible storage and retrieval of data for first and second application programs is selected from at least one of the first and second storage regions. In another embodiment of the invention, the storage system further comprises a third storage region, and the method further comprising providing read/write compatible storage and retrieval of data in the third storage region for the first and second application programs. In yet another embodiment, the inventive method further comprises providing a boot control indicator for controlling the booting of the device, wherein the boot control indicator is selected from the group consisting of an electrical signal received from an external signal source, and a state of a bit stored in a bit storage location within the device. In another embodiment, the control of the booting is influenced by a boot loader procedure.

Numerous applications of the inventive system, method, and computer program are provided for data movement and transfer, dedicated email upload and download, dedicated data upload and download, dedicated data acquisition, dedicated electronic book or e-book player, dedicated digital audio player, data push triggered by an external service, diagnostic and repair, as well as others.

Other embodiments of the invention provide computer software and computer programs that are used to provide the inventive structure on the device, and/or are loaded on the device itself to provide the operation.

In a further aspect, the invention provides a method for performing service on an information appliance, such as a desktop computer, a notebook computer, a palm top or other hand-held computer, or other electronic device having a processor coupled to memory. The method comprising steps of: providing a primary operating system on a first storage device partition, providing a secondary operating system on a second storage device partition different from the first partition, and if the primary operating system requires service, then operating the computer with the secondary operating system, and performing a service procedure to the first operating system or to software or hardware operable with the first operating system while operating under the second operating system.

In another aspect, the invention provides an information appliance comprising: a processor; a memory coupled to the processor; at least one storage device on which at least one of a first and a second partitions are defined; a primary operating system stored on a first partition; a secondary operating system stored on a second partition different from the first partition; a controller for controlling the information appliance to operate under the secondary operating system under predetermined conditions; and the information appliance being operated under the second operating system while performing a service procedure to the first operating system or to software or hardware associated with the information appliance.

In yet another aspect, the invention provides a method for loading software onto an information appliance, the method comprising steps of: defining a first partition on a storage device of the computer; defining a second partition different from the first partition; installing a secondary operating system and a computer program on the second partition; and executing the computer program code while operating in the secondary operating system, the computer program code being operative to load a primary operating system onto the first partition from an external source.

In yet another aspect, the invention provides an apparatus for use with a computer or information appliance where the apparatus includes: a portable non-volatile memory device having plurality of electrical contacts disposed on an external surface thereof for coupling to an electrical circuit; a computer operating system stored in a data structure defined within the non-volatile memory; and security means controlling access to the stored computer operating system only with authorization.

The invention also provides computer software and/or firmware programs and computer program products, including such computer program products stored on tangible storage media or alternatively communicated electronically over a communications system such as the internet, that implement the inventive methods and procedures described.

DETAILED DESCRIPTION OF EMBODIMENTS OF THE INVENTION

With reference to FIG. 1, we now describe a conventional computer system 100 of the type with which the inventive structure and method may be used. In connection with this description, it should be understood that the system is merely exemplary of the general class of features and components which may be present in such a computer system 100; however, the inventive structure and method are not restricted to this particular embodiment of a computer system. Furthermore, the exemplary computer system 100 is described primarily to set the stage for the description of the invention so that the differences between the conventional computer system 100 and be inventive computer system 200, as well as the inventive methodology supported thereby, may be more readily understood.

Computer system 100 includes a processor (or CPU) 102 and a system memory (RAM) 104 coupled to the processor. Typically code providing a basic input output system (BIOS) is provided in a memory 108 (typically a read-only memory or ROM, but increasingly memory susceptible to both read and write operations for more ready modification and upgrade).

During a boot operation, the basic input output system from BIOS 108 is typically loaded into system memory 104 (along with code and/or data from a non-volatile read and write storage device 140, such as a hard disk drive. The distribution of code and data between the BIOS 108, system memory 104, non-volatile read/write storage 140, and processor 102, in conventional systems is known in the art and not described in detail here. Computer system 100 also includes a power source 134 which may for example be a battery, and internal power supply, and the AC power line, were a number of other power sources or power supply devices as are known in the art. The on/off switch 136 is also typically provided for operation by a user to transition the computer system from a non-operational state to an operational state.

In early computer systems, the on/off switch 136 was operational to connect and disconnect electrical operating power to components of computer system 100; however, in computer systems of more recent vintage, the on/off switch 136 is more typically operational to generate a signal which is received by processor 102, and which in turn transitions the computer system from a non-operational state to an operational state.

In the case of a cold boot, a processor is typically started by powering it up and asserting a signal to its "reset" pin. The reset process puts the processor in an initial startup state and causes it to begin execution of boot startup code at a predefined location in memory. A personal computer or information appliance system may implement a hardware power-on switch with logic which ties an influence from a hardware switch to the generation of this reset signal. In one embodiment, the personal computer or other system, receives this reset signal generated automatically by either an internal circuit or other means or from an external circuit or control means. For example, the reset signal may be generated as the output of an alarm on a real-time clock or timer that runs independently of the processor power.

A case of a warm boot results in the same or similar follow-through of events as that initiated by a cold boot, except that the process begins from an already-powered-on state. For instance, in one embodiment, the Operating System executes deterministic code to shutdown and immediately execute into the steps of the reset process. Alternatively, the user manipulates a button which ultimately causes a "reset" signal to be asserted to the process independently of what the process is executing at the time the user hits the button. Additional information pertaining ro the reset process in Intel based processors is available as of 4 Apr. 2000 at http://developer.intel.com/design/pentiumii/manuals/24319202.pdf, herein incorporated by reference.

In the description of the inventive structure and method, transition between powered-on and powered-off or other operational versus non-operational state is supported for both types of switch implementation.

In the case of either type of switch, processor 102 becomes aware that it should transition from a non-operational state to an operational state and begins a cool or cold boot operation. For a power interruption/re-connection type power on sequence, processor 102 receives a reset signal 138. For any interrupt driven power on sequence, processor 102 receives an interrupt signal 139. These signals, there equivalent, or a signal source mimicking these signals may be used to initiate booting of the computer system when an unattended boot operation is desired.

Computer system 100 may also typically include other devices 111 that couple either directly or indirectly to processor 102. They include, for example, one or more input output (I/O) ports 112 which themselves couple to one or more input/output devices 114 or are available for such coupling, a keyboard 116, the pointing device 118 such as a mouse, a trackball, a TrackPoint™ device, a touch screen, or other devices that allow a user to designate a particular location on the screen or to select some functionality (such as by pressing a button or selecting a menu item, provided by the computer system. Computer system 100 also typically includes an optional modem 120 for connecting to an external network or system such as the Internet 121, and audio subsystem 122 possibly including a transducer 124 such as speakers or ear phones for converting electrical signals generated by the processor into acoustic signals, a parallel port 126 for connecting to, for example, a printer 127, and an optional network interconnect card (NIC) 128 for connecting to an external network or system such as a local or wide area network.

Computer system of 100 also typically includes a display subsystem 130 including a monitor or display device 131, and graphics card or graphics chipset 132. Frequently, the graphics card or chipset may be incorporated into the functionality of processor 102.

The PC card bus slot 136 adapted to receive the PC card (or PCMCIA card) 138 may also typically be provided with portable computer systems and information appliances. The PC card 138 may typically be coupled to the processor 102 via a high speed bus. Numerous PC card devices are known in the art and are not described here.

One or more system bus 134 is typically used to communicate data, commands, control, and other information between and among the various components described here. In general, multiple buses and bridges are used to interconnect major components of the computer system 100 and to permit ready communication between chips and devices using different communication protocols. For purposes of this description, we do not describe or differentiate between the various conventional architectures using single or multiple bus constructs or dwell on the existence or absence of bridge circuits to interconnect components, as these aspects are not particularly relevant to the inventive structure or method, and as the inventive structure and method is compatible with all known conventional architectures. For example, although a relatively complex structure has been described for a conventional computer system 100, it will be readily apparent to those workers having ordinary skilled in the art in light of the description provided here that much simpler architectures are compatible with the inventive structure and method, for example, computer systems having only a processor, memory, and storage device configured in the manner described elsewhere in the specification are sufficient to support aspects of the invention.

Attention is now directed to the structure of nonvolatile read/write storage device 140, usually a rotating media or magnetic hard disk drive. In some computing systems, two or more physical storage devices 140 (140-1, 140-N) may be provided to increase the storage capacity of the system. Largely for historical reasons, hard disk drives are logically divided into one or more partitions 150, were a single physical hard disk drive may include a plurality of storage regions. As is known by those workers having ordinary skill in the art, personal computer systems developed during the late 1970s and early 1980s had hard disk drives in the five to fifty megabyte (5–50 MB) range, and operating systems that anticipated only moderate growth of such hard disk drives in terms of their ability to handle large disk drive capacities in a single partition, certainly not growth toward multi-GB disk drive sizes. Therefore, as the need for and existence of larger capacity disk drives arose, it was common to logically divide the full physical capacity of the disk drives into smaller partitions which were more readily handled by the operating systems. For example limitations of approximately 500 MB and 2 GB existed during the development of the computer systems and operating systems used by such computer systems.

Other reasons for multiple partitions included the desirability of placing two or more operating systems on a single computer system in a manner that operation of any one of the operating systems does not cause problems for the other operating systems, or the data or application programs used in association with each of the different operating systems. Typically, conflicts of this type have been eliminated by placing the different operating systems and their data and application programs on two separate partitions. However, while some conventional systems provided more than one operating system on a storage device, such multi-operating systems computers have not heretofore provided the same structure, operating system or application program interoperability, or functionality provided by the present invention.

In computing system 100, the disk drive 140-1 is illustrating having a single partition (partition 1) 150 by allowing for other optional partitions on the same disk 140-1 as well as allowing for additional read/write storage devices 140-N on separate physical devices.

Consistent with DOS and Microsoft Windows operating systems and as used for the additional designs of IBM compatible personal computers, hard disk drive 140-1 includes a partition 141 which itself includes a partition sector 142, partition sector code 143, a partition table 145 having four storage locations 146, 147, 148, and 149. In the event that these four locations are insufficient the hard disk drive may contain an additional partition table 160 relocated for more than four partitions. The hard disk drive is partitioned when it is desired to logically divide the hard drive into separate storage volumes, or when it is desired to install more than one operating system on the same hard drive. Preparation of hard disk drive for use by operating system has conventionally involved a low level format operation and a hard disk drive partition operation. The structure and operation of hard disk drive partitions is known in the art and not described in greater detail here; however, the book *"PC Intern—The Encyclopedia of System Programming"* (Michael Tischer and Bruno Jennrich, published by Abacus, 5370 52nd Street SE, Grand Rapids, Mich. 49512 USA in 1996 (ISBN 1-55755-304-1), pp. 355–358) hereby incorporated by reference, describes hard disk drive partitions generally, and more particularly the formatting process, partitioning of a hard drive, the structure and operations of partitions sectors and the partition tables, starting a boot partition, and other information contained in the partition table.

Formatting (low-level formatting) organizes the disk drive into cylinders, tracks, and sectors by writing appropriate address markers onto the disk drive surface. The address markers are later used by the controller in conjunction with the operating system to identify the specific sectors.

Partitioning hard drive into separate areas lets each of multiple operating systems manage its own disk space without the conflict caused by different file structures. Partitioning also facilitates the ability to use additional capacity provided by larger disk drives than were anticipated when partition size limits were implemented in early versions of DOS. For example, some early versions of DOS were able to manage hard disk drive capacities of only about 32 MB. Even in DOS version 4.0 the maximum capacity of the supported drive was only 2 GB. While a primary partition must be located within the first 32 MB of the hard drive, so-called extended partitions could be located anywhere.

Partition sector 142 is the structure that all version of DOS and Windows use to define a hard disk drives partitions. For example, when the DOS program FDISK is run for the first time, it creates the partition sector in the hard disk drive's first sector, that is cylinders 0, head 0, sector 1. The BIOS first loads the partition sector after the system is started instead of the DOS boot sector. According to convention, if the BIOS finds values55H, AAH, in the final two bytes of the partition sector's 512 byte storage allocation, it interprets the sector to be executable and starts executing the program at the first byte of the sector. If the BIOS does not find these values, it displays an error message and then takes other action which is typically dependent on the BIOS and manufacturer. The hard drive partition sector includes a partition code, and four 16-byte entries in the partition table, as well as the afore described two-byte ID code (AA55h) which identifies the partition sector as such.

This program recognizes and starts the active partition's operating system by loading the operating systems boot sector and passing control to the program within that boot sector. The program using the partition table must be able to find the boot sector for the active partition, and uses the partition table for this purpose. Each entry in the partition table contains 16 bytes. The partition table is located at the end of the partition sector leaving only enough room for four entries. When more than four partitions are needed, some hard disk drive manufacturers use a special configuration program to relocate and enlarge the partition table and adapt the partition sector code to use this relocated table. In some instances, the partition sector code 143 is changed to allow loading of any of the installed operating systems on the hard drive thereby facilitating selection of the operating system that should be run when the computer is first started.

We now describe an exemplary embodiment of the partition table structure. The partition table includes a one-byte partition status indicator, where 00h (00 hexadecimal) identifies that particular partition as being in active and 80h identifies that particular partition as being in the boot partition; one-byte identifying the read/write head with which the partition began; a one word identifier for the sector and cylinder with which the partition began; a one-byte partition type indicator or other code that is compatible with the particular operating system or special driver software; one-byte to identify a read/write head with which the partition ends; one word to identify the sector and cylinder with which the partition ends; one double word to identify removal of first sector of the partition (boot sector) of partition sector in sectors; and one double word to identify the number of sectors in this partition. With respect to the partition type, the following information may typically be set forth: 00h=entry not allowed, 01h=DOS with 12-bit FAT (primary partition), 02h=XENIX, 03h=XENIX, 14h=DOS with 16-bit-FAT (primary partition), 05h=extended DOS-Partition (DOS 3.3), 06h=DOS-4.0 partition with more than 32 MB, DBh=Concurrent DOS. These constructs, codes, an operation is known in the art (See for example *"PC Intern— The Encyclopedia of System Programming"* at pages 355–358) and not described in greater detail here.

The first field of each partition table entry indicates whether a partition is active. For example, the value of 00h indicates that the partition is not active, why value of 80h indicates that the partition is active in should be diluted. If the partition sector program detects the more than 1 partition is active or that none of the partitions are active it typically abort Steve booting process and displays an error message, and frequently enters a continuous loop that can only be exited by the setting. When the partition sector program recognizes the active partition, it uses the next two fields to determine the location of this partition on the hard disk drive. The sector and cylinder numbers are expressed as BIOS interrupt 13H (diskette/hard drive), including bits 6 and 7 of the sector number, which represent bits 8 and 9 of the cylinder number. At this stage, BIOS interrupt 13 H and its functions are generally the only way to access the hard drive, the DOS or other operating system functions usually not being available because the DOS or operating system boot has not yet completed.

Partition table 145 also contains additional information. For example, each entry typically has a describes the operating system for the partition in addition to the partition starring sector, and another field that contains the partition's ending sector, expressed as the combination of cylinder, had, and sector numbers. An additional field for each table entry identifies the total number of sectors within the partition and a second additional field for each table entry identifies the distance of a partition's boot sector from the partition sector counted in number of sectors.

In computer system 100, the storage device 140-1 provides only a single partition 150 to support the normal single operating system environment. Partition 150 therefore includes storage for programs and code (including any data or parameters) for a single operating system 151, the file system 152 such as for example the DOS compatible file allocation table (FAT) file system or the Windows NT file system (NTFS), device drivers 153, one and typically a number of application programs 154, and user data 155.

Operating system 151 may for example be any version on Microsoft DOS (e.g. Versions 2.x, 3.x, 4.x, ... ), any version of IBM operating systems (e.g PCDOS, DR-DOS, O/S1, O/S2, etc.), an version of any version of Microsoft Windows (e.g. MS Windows 3.x, 95, 98, NT3.x, NT4.x, 2000, 2000 Professional, 2000 NT, MS Windows CE 1.x, 2.x, etc.), any version of UNIX, any version of Linux, and so forth. It may, with modifications that will be appreciated by those workers having ordinary skill in the art, be any of the Apple Macintosh operating systems (e.g. MacOS, System 7, System 8, etc.) with the proviso that certain changes may be needed to the partitioning structure of the storage device.

Exemplary processors include any x86 type processor including but not limited to Intel '386, '486, Celeron, Pentium, Pentium II, and Pentium III; Advanced Micro Devices (AMD) K6, and Athlon; Transmeta Crusoe, the PowerPC processor used by the Apple Macintosh; and the Sun Microsystems' SPARC processor.

Figure 2:
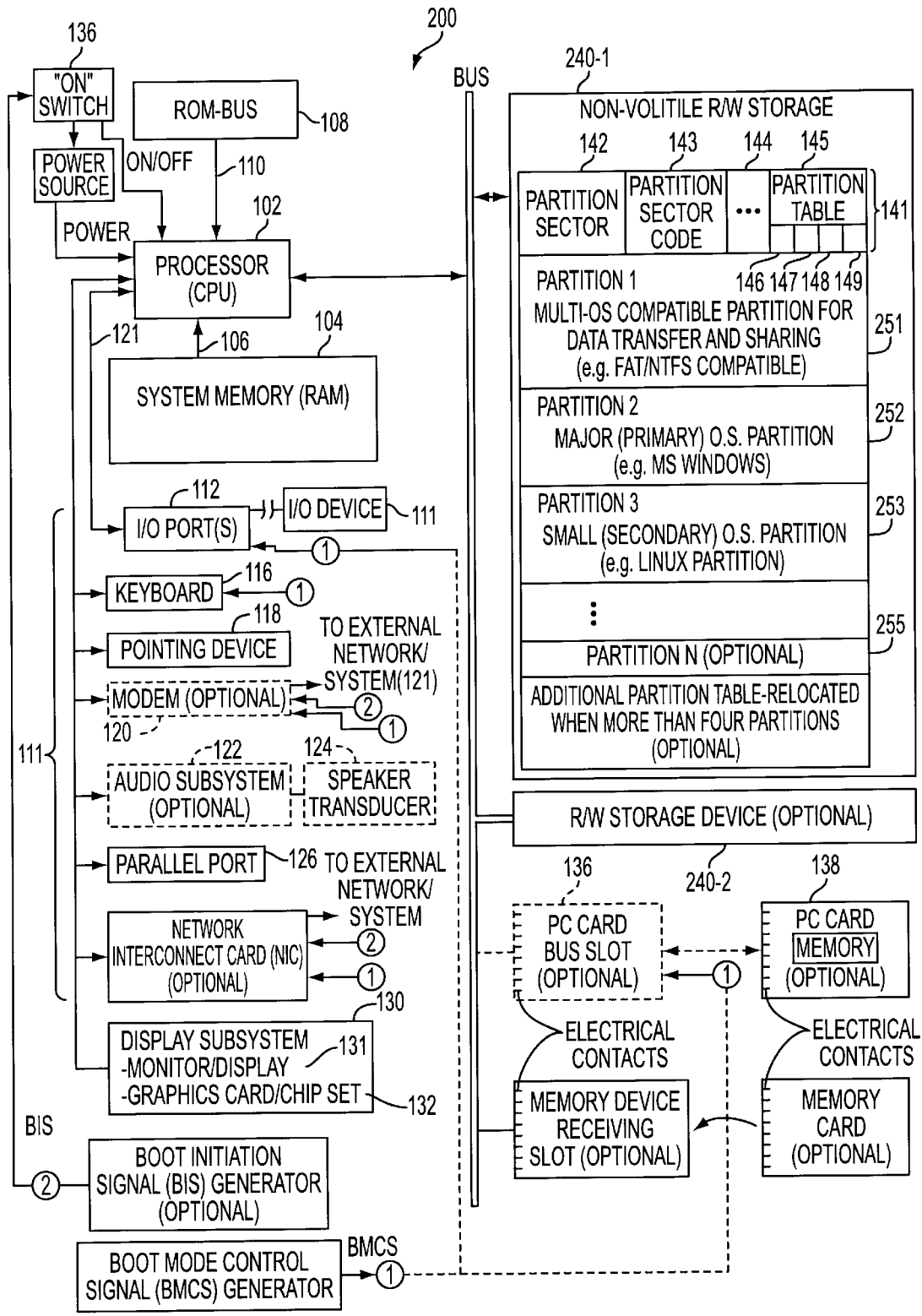
FIG. 2 is a diagrammatic illustration showing a diagrammatic illustration of a first exemplary computer system or information appliance incorporating the inventive structure and method including the manner in which a storage system or storage device or devices is or are partitioned to support multiple operating systems.

With reference to FIG. 2, we now discuss some of the differences between conventional computer systems 100, such as that illustrated in FIG. 1, and the inventive structure and method. In one embodiment, the invention is adapted for use with conventional computer devices such as desktop and notebook personal computers. The compatibility with conventional personal computers is particularly advantageous as it allows a computer manufacturer to produce a single item of computer hardware that provides either the single operating system configuration or the duel or multi-operating system configuration of the present invention. In other embodiments, the inventive structure and method may be used with other information appliances, instrumentation systems and devices, personal data assistants, palm top systems, kiosks, information systems generally, and any computer or information device or appliance having the minimum set of characteristics required for operation of the inventive system and/or method.

As the inventive structure and method may be used with suitable modification or configuration of at least some conventional devices, one of the primary differences between conventional computer system 100 and inventive computer system 200 concerns the structure and organization of nonvolatile read/write storage device 240-1, typically a hard disk drive but also possibly a solid-state memory or the combination of a hard disk drive or drives (and/or other rotating media drives) and solid-state memory. Programmatic and software differences are also desirable to implement the inventive procedures. Read/write storage device 240 includes a partition 141 having a partition sector 142, partition sector code 143, and a partition table 145 as in the conventional system. Storage device 240 also includes at least two partitions, and in one embodiment at least three partitions. The organization of storage device 240 is now described in greater detail.

We first describe a three partition embodiment as it is the configuration that is operative for the widest variety of operating system combinations. Two, one, and multi-partition embodiments are described elsewhere in the specification. The three partitions 251, 252, 253 may be located in any order and within any particular set of disk drive storage locations (or storage locations distributed across multiple disc drives or other storage devices) and references to first partition 251, second partition 252, and third partition 253 are merely for the purpose of convenient description. The first partition 251 is referred to as the "compatible" partition and is used for data transfer and sharing between two operating systems located respectively on the second 252 and third 253 operating system partitions. The general requirement for the compatible partition is that each of the operating systems, or application programs executing within the operating system environment, is able to read from and write to this first partition. For example, a multi-operating system compatible partition may provide for DOS and Windows file allocation table (FAT) file organization. In more general terms, the file organization of the compatible partition can be any file organizational structure and type so long as the data to be shared between application programs executing in the two operating system environments are each able to read and write to the compatible partition. It is also not a requirement that all application programs be able to read from and write to the compatible partition, but merely are able to read from and write to files and data structures which are to be shared.

The second partition 252 is referred to as the "primary" partition and contains the full function operating system for the computer system 200. Typically, this full function operating system will be a larger (and slower loading) operating system on the computer. For example, it is anticipated that this primary operating system would be selected from the group which includes Microsoft Windows (Versions 3.x, 95,98,2000, NT3.x, NT4.x, NT2000, and 2000 Professional), UNIX Versions such as Sun Solaris, Apple Macintosh (Version 7, 8, 9, X), Linux, and improvements, modifications, and enhancements to these operating systems. The particular capabilities of each of these exemplary operating systems are known by workers having ordinary skill in the art and not described in detail here. To it will however be appreciated that each of these primary operating systems includes a fairly sophisticated graphical user interface, drivers for an extensive array of computer peripheral devices, and in large amounts of software program structures and code that permits the operating system to work for a large number of different computer system hardware configurations and insulation environments. For at least this reason, these types of primary operating systems consumed a relatively large number of computer system resources and require a relatively long period of time to load as a result of their size and/or complexity.

More generally, the selection of a primary and secondary operating system, and in fact of any primary, secondary, tertiary, quartranary, and the like operating systems may be made as desired by the user so long as the principles set forth in this description are observed. Among the operating systems that may be used include as primary operating systems Microsoft Windows 3.x, Microsoft Windows 95, Windows 98, Windows Millennium Edition, Windows NT 3.x, Windows NT 4.x, Windows 2000, other Microsoft WIN32-type operating systems, Unix and other Unix versions such as Sun Solaris, Linux, and MacOS or other Apple Macintosh OS (Version 7, 8, 9, X), as well as improvements, modifications, and enhancements to these operating systems. Secondary operating systems include Linux, Windows CE, Windows NT Embedded Edition, Microsoft Windows 95, Microsoft Windows 98, Windows Millennium Edition, Windows NT 3.x, Windows NT 4.x, Windows 2000, other Microsoft WIN32-type operating systems, Wind River's VxWorks, and DR-DOS (now sold by Lineo), PalmOS, BeOS (which is an operating system adapted to support particular types of media such as digital audio playback), and Unix, as well as improvements, modifications, and enhancements to these operating systems. While the primary and secondary operating systems may in principle be the same, many of the advantages provided by the invention would not normally be realized unless some customization were made so that different versions of these "same" operating systems were provided.

The third partition 253 is referred to as the secondary operating system partition (but also referred to as the "fast boot partition," "appliance partition," or "embedded partition," depending on the application) and contains the secondary operating system (also referred to as the "fast boot operating system," "appliance operating system," or "embedded operating system") which provides a minimum set of operational features so that it can be loaded very quickly relative to the time it would take for the primary operating system to load. These exemplary operating systems are not to be taken as limiting as the secondary operating system. It is also noted that in some embodiments, the operating system will also include the application program functionality or vice versa so that an actual conventional operating system per se, is not actually required so long as the "program" or "code" booting and/or loaded after the boot provides the requisite functionality.

It is further noted that although the primary advantage for providing multi-operating systems support using the compatible partition 251 arises because of the ability to achieve a rapid or fast boot capability with data sharing, the inventive structure and method also and alternatively provides the ability to deploy and utilize operating systems having similar capabilities, comparable sizes, and similar load and execution times. In another words, a dual-boot capability supporting comparably functioned but different operating systems. Even if the primary and secondary operating systems are of similar complexity, it might still be useful to apply the invention because the two operation systems may differ in their superiority of support for specific functions. Therefore, more generally, the operating systems stored on each of the second partition 252 and third partition 253 may have comparable characteristics. For example, computer system 200 may provide both Microsoft Windows 2000 and UNIX, Microsoft Windows 2000 and the full version of Linux, Microsoft Millennium Edition and Microsoft 2000, or the full version of UNIX and a full version of Linux. Other combinations are also possible.

Where it is desired to have more than two different operating systems on computer system 200, such as to have three operating systems, a multi-operating system compatible partition 251 is provided as before, and each of the three operating systems is provided with their own partitions. For example, the configuration may be provided for a system which includes Microsoft Windows NT 4.0, Microsoft Windows 2000, Microsoft Windows CE 2.0, and Linux 6.1. Those workers having ordinary skill in the art will appreciate that the number of combinations are possible within this scheme. Other configuration may provide for two or more operating systems that can interact using the compatible partition, and additional operating systems that do not interact with others through the compatible storage regions.

While the embodiments described heretofore have suggested that additional and separate partitions are required for each additional operating system, beyond the need for the existence of a storage region which both or each operating system is compatible with, this need not be the case. Co-pending patent application Ser. No. 09/406,048 filed 27 Sep. 1999 for *System and Method For Achieving Rapid Operating State if an Application Program in a General Purpose Computer Device* describes an embodiment of the invention where the primary operating system is Windows 95 residing on a FAT partition and the appliance-mode operating system is DOS residing on the same partition. Furthermore, the embodiment involves program logic running in Windows 95 and DOS using this same partition to contain the data shared by programs in the two operating systems; in other words, this same partition, where the primary and appliance mode operating systems reside, also serves to contain the compatible storage region. More specifically to the new inventive structures introduced in the present invention, embodiments exist where one of the storage regions where one of the operating systems resides also serves as the compatible storage region by virtue of it being usable by one or more of the other operating systems. For example, the DOS, VxWorks, and DR DOS operating systems are three examples of operating systems that could reside on a FAT partition, which partition could also serve as the compatible partition in a system that includes an operating system such as Windows NT, Linux, or Unix as the other operating systems, residing on a partition formatted with an organization different from FAT.

More generally, systems providing only one or two physical partitions are also supported by the inventive structure and method. Logical partitions or logical storage regions may then be provided where the mapping from a storage region (or logical partition) to a physical partition is either one-to-one or many-to-one. For example, in the case where there are two physical partitions and a need for three storage regions or logical partitions, the mapping between storage regions and partitions is not one-to-one. A single physical partition may be segregated into one, two, three, four, or more logical partitions or storage regions.

In one particular embodiment, the fast boot operating system also referred to here as the appliance mode operating system and the compatible region are on the same physical partition, but on different logical partitions within that physical partition. In another embodiment, the appliance mode region is on one partition and the compatible and primary operating system regions are on the a second partition but on separate logical partitions within the second physical partition.

The use of the File Allocation Table (FAT) as an example of a compatible file organization for different operating systems is advantageous, but not required. It is advantageous for its convenience as FAT it is old enough to be compatible with many different operating systems. The VFAT structure is a successor to the original FAT that was designed to support enhancements in Microsoft Windows 95. For example, the FAT scheme is compatible with various Disk Operating Systems—DOS (Microsoft DOS 2.x and above, IBM PC DOS, DR-DOS, and the like), Microsoft Windows 3.x, 95,98, NT, Millennium, 2000, and the like; UNIX; Linux, Windows CE; and the like. The FAT scheme originated with DOS and variations and extensions have been made from time to time, for an extension example to permit long file names in Microsoft Windows 95.

At a higher level, the compatible portion 251 of the storage device (e.g. hard disk drive, semiconductor memory, or combinations of the two) 240 may be any compatible file storage format from which at least two different operating systems in the same computer system may read from and write to.

The inventive structure and method also support a computer system in which the different partitions are located on different physical devices. By way of example, a computer system 200 supporting both Microsoft Windows 2000 and Microsoft Windows CE 2.0 may be configured to provide the Microsoft Windows CE 2.0 operating system and the compatible partition in a solid state memory (such as flash memory, SmartMedia cards, or powered RAM) and the Microsoft Windows 2000 operating system on a hard disk drive. Alternatively, the compatible portion may be the hard disk drive either in the same partition as Windows 2000 or in a separate partition. Compact flash memory or other solid state memory is appropriate for the compatible portion and the small secondary operating system because the size of such memory, either as a single memory device, or as a small array of such devices, is large enough to provide the required storage capacity. In some embodiments, the solid state memory device may be removed so as to provide different plugable operating system options at the time of boot. For example, a compact version of the Linux operating system may be provided on one removable semiconductor device and a different small version of DOS on another such device.

The two (or more) operating systems are desirably placed on separate partitions for several reasons. For highly optimized operating system like Microsoft Windows NT part of the slowness of the cold boot is due at least in part to the need to set up tables and other data structures that are needed to support and interact with the optimized operating system. Frequently, the complexity is further increased by the need for the operating system to be able to interact with it large class of computer system and information appliance hardware and application software, whether present on the particular computer or not. To provide the fast boot or appliance mode capability of the secondary operating system it is advantageous that the secondary operating system saves the storage space and time related expense associated with setting up data structures that are not needed to perform the small sad of application programs or otherwise provide the features needed by the particular set of hardware and to allocate only a few sectors for such storage. When the inventive structure and method are provided directly by an OEM computer manufacturer, such manufacturer is able to tailor the secondary operating system to substantially match the hardware and application program features of the computer they produce. Therefore, the secondary operating system may be optimized for a particular set of hardware or for the set of hardware models produced by the manufacture.

Preferably the operating system in one partition does not need to write to the other operating system's partition or partitions, and only writes to the compatible partition. (The inventive structure and method do not require limiting the ability of the operating systems from interacting with the other operating system or their respective partitions.) The two operating systems interact in a predictable and well-defined manner via the compatible region. Typically, the secondary operating system does not need to know how to write to be primary operating system's partition. This provides both the measure of safety, in that inadvertent writing to the other operating systems partition that make corrupt one or more files for that operating system will generally not occur in the absence of a component failure. It also has the benefit that by not seeing the larger and more complex primary operating system environment, it will not take the time to build the data structures or otherwise account for a storage volume (portions of the physical or logical storage device). Therefore, one of the desirable defining features of the inventive structure and method is that the secondary operating system does not need to see and does not need to write to the primary operating system partition.

On the other hand, although it is desirable from a safety standpoint that the primary operating system does not write to the secondary operating system's partition so as to avoid inadvertent corruption of files or other data structures, there is no per se requirement that the primary operating system be unable to view or interrogate files within the secondary partition. More particularly, is anticipated that either the primary operating system or diagnostic utility programs operating within that primary operating system environment will be able to view, query, and potentially modify contents of the secondary operating system partition. The disk diagnostic program Norton Utilities made by Symantec and writing within the Microsoft Windows operating system environment would, for example, be expected to have read/write access to any physical area underlying any partition within any storage device in the computer system.

It is noted that in some aspects, the inventive structure and method described here represents an extension or elaboration of some of the inventive embodiments described in co-pending U.S. Utility patent application Ser. No. 09/406, 048 filed 27 Sep. 1999 for "System And Method For Achieving Rapid Operating State of an Application Program in a General Purpose Computer Device" for non-DOS based operating systems. It provides for separately partitioned storage (either different physical partitions or different logical partitions) and the interactions among and between the separate storage regions as well as, in the use of a flag indicator or controlling switch and applications of the particular fast boot or appliance boot mode. It is also noted that one difference between Windows 9x (e.g. Windows 95 and Windows 98) and Windows NT (e.g. Windows NT 4.0) is that Windows 9x actually runs on top of (or at least as a continuation or extension of) a DOS session or layer. Therefore, the specific AUTOEXEC.BAT-based boot control described in the co-pending application is possible for Windows 9x. In Windows NT, the inventive method using a boot loader level with additional mode control is one way, and perhaps one of the few ways or the only way, to do this. Windows 2000 is just the next version of Windows NT and Windows Millennium Edition is just the next version of the Win 9x architecture and would follow their predecessors. In analogous manner, Linux and Unix are like Windows NT and Windows 2000 and do not run from a DOS session.

In one embodiment of the invention some partitioning of a single physical storage device or even of multiple physical storage devices may be invisible to one or more of the operating systems. For example, in one embodiment, the appliance mode operating system is Linux, the primary operating system is Windows NT, and partition number 1 in the system is formatted in the format native to Linux (for instance, ext2fs), partition number 2 is the compatible partition in the FAT format, and partition number 3 is in the NTFS format. Linux resides on partition number 1, and NTFS resides on partition number 3, in this example. Our sequential numbering of partitions in this example is in the order that the partitions are sequentially identified by the system at boot time by the same logical mechanism that consistently maps alphabetical references to "C:", "D:", "E:", etc., in a normal single-operating system Windows computer with multiple partitions. From the running environment of the appliance mode operating system, Linux in this example, partition number 1 would be the native root of the file system hierarchy, "/", partition number 2 could be mounted at /msdos in the Linux file system hierarchy, and the third partition is not visible to the Linux file system. From the running environment of the primary operating system, Windows NT in this example, partition number 1 would not be visible to the Windows file system, partition number 2 is referenced as "C:", and partition number 3 is referenced as "D:". This example shows a natural visibility or invisibility of partitions by various running environments due to the natural availability or installation of drivers for various partition formats, and the possibly different logical file system organizations of the different operating systems for referring to the plurality of partitions.

In another embodiment which exemplifies the two-partition model, the appliance mode operating system is MS-DOS, the primary operating system is Linux, and partition number 1 in the system is formatted in FAT format and partition number 2 is formatted in the format native to Linux (for instance, ext2fs). MS-DOS resides on partition number 1, which is also serves as the compatible partition, being in the FAT format, and Linux resides on partition number 2. From the running environment of the primary operating system, Linux in this example, partition number 2 would be the native root of the file system hierarchy, "/", partition number 1 would be mounted at /msdos in the Linux file system. From the running environment of the appliance mode operating system, MS-DOS in this example, partition number 1 would be referenced as "C:" and partition number 2 would not be visible to the DOS file system.

We now direct our attention to some preferred characteristics of the secondary operating system to provide the fast start-up features desired. The secondary operating system desirably is as small as possible to facilitate fast loading and execution and contains only those software programmatic features needed to support the intended application on the target computer or information appliance hardware platform. Again, provision of such programmatic features by an OEM equipment manufacture facilitates identification and matching of the essential programmatic features.

If we consider the Linux operating system as an exemplary secondary operating system, many simplifications can be made that support a class of application programs suitable for a fast or rapid start computer or information appliance. For example, portions of the operating system needed to support warm boot, multiple simultaneous Windows, suspend state, a sophisticated graphical user interface (GUI), network interconnect, modem support, more than one processor type, or the like may be selectively eliminated (or included) for particular installation. It will even be desirable to tailor two or more so-called "secondary" operating system configurations and to be able to select from this multitude in addition to being able to select between a secondary operating system and the primary operating system on power up. (We describe particular examples of such two secondary operating system usage relative to a fast start contact manager type application program, and an unattended file load download application program, elsewhere in this description.)

It will be appreciated that XWindows is the standard Unix and standard commercial Linux windowing system intended for large applications and multi-windowing environments. More particularly, XWindows is a large windowing system supporting advanced features such as network-based connection to remote sessions. For a fast boot mode (appliance mode) of operation having either no windowing system, only one window, or a multi-windowing system that does not require such advanced features, a smaller windowing system, such as for example Micro-Windows may advantageously be used. (Microwindows is an Open Source project. Information on it can be found os of April 2000 one the world wide web at http://www.microwindows.org and at http://microwindows.censoft.com, herein incorporated by reference. In fact, for some applications (such as the to be described unattended file load/download application) no windowing system, or at least no windowing system supporting a graphical subsystem, may be required. In addition, Linux tends to be a server environment so that the standard releases of Linux include server support for a variety of different protocols (for example, mail servers, Web servers, and the like). In a fast boot configuration where some or none of these protocols need to be supported, the operating system modules that provide this server support (or particular categories of server support) may be selectively eliminated to increase to speed of the boot operation, the speed of shutdown, and to minimize storage space consumed on the storage device and within system memory. Linux, being readily available open source code, may readily be modified and customized to provide only the required system modules for the intended operation.

One exemplary embodiment of the Linux operating system modified to provide only a minimum set of capabilities for the fast boot mode (appliance mode or embedded mode) would include: (1) an operating system kernel and any essential device drivers, (2) a compatible file system for use in data sharing and transfer, (3) the Linux native file system (only required when the Linux operating system is on a partition separate from the compatible partition), (4) a command interpreter, and (5) a rudimentary (non-graphical) display driver. The operating system kernel is the manager of the entire system, and for example typically knows which program is using what memory, which program is currently executing in the foreground and which programs are executing in the background (for a multi-tasking environment), the priority of threads, and the like.

When it is desirable to provide a graphical interface for the user, such as in the case of an email application, a contact manager, or the like applications, where the user has a reasonable amount of interaction with the display device and where the penalty in terms of a small delay for loading and execution of the secondary operating system would be out weighed by the utility of the graphical user interface, then a (6) browser or viewer, a more sophisticated (7) display driver, and/or a (8) graphics library may desirably be added to the basic operating system modules described above.

Where desirable to provide merely an unattended file upload/download capability, then a certainly the sophisticated display driver and graphics library may be eliminated and in many cases, even the rudimentary non-graphical display driver may be eliminated from the required secondary operating system modules. As there is no need for a user to interact with the computer system during such unattended operation, there is need for information to be displayed, no need for the keyboard to be monitored for commands or other key presses, or the like. On the other hand, there is a need for modem, ethernet, or other remote access or network conductivity to support the file up load or file download operation. Such support would typically include drivers for the connectivity hardware and support for any protocol may be used during the file up-load or file down-load operation. For example, assuming that the Linux operating system is to provide unattended network upload and/or download to or from the Internet, then the secondary operating system should also provide in networking driver for the TCP-IP protocol stack.

We note that even for the fast boot mode of operation, the set of required capabilities and therefore of system functionality to support those features may vary from application to application. Some of his flexibility can be accommodated using special "boot loader" programs. Embodiments of the inventive structure and method do not require a change in the BIOS. Instead manufacturer provides a special boot loader program that has a special line or lines of code that causes a value or other indicator to be read during the boot process. This value or indicator controls which of a plurality of boot options are to be taken. A boot loader program is a program resident in the master boot sector which is the first place the BIOS reads and that all selects, loads, and starts the operating system that will be used by the session and which supports applications that are subsequently launched during the session.

Figure 4:
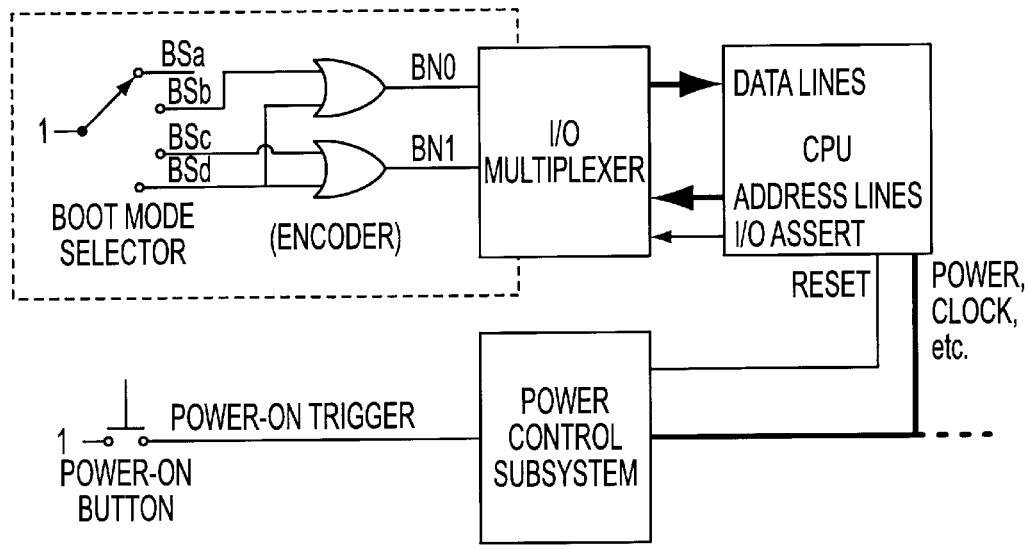
FIG. 4 is a diagrammatic illustration showing an implementation of an embodiment of a procedure based on conveying the boot mode selection to the PC system via a parallel binary data channel.

In one embodiment of the invention, this boot loader program incorporates a special line of code in it (for example, in the case of an x86 PC, one which executes the machine instruction {in register, portnumber}, as described relative to FIG. 4 below) that causes inputs to the CPU's logical I/O port addressed by the port number to be read and stored in a CPU register. For example, the Intel x86 family of CPUs uses this model. The input to the CPU at a specific port number may be derived from electrical signals, which in turn may be derived from a hardware switch that the user can access as a control knob with positions labeled by dedicated task (and implicitly, selecting from one of a plurality of operating systems to boot to accomplish that task), as depicted in FIG. 4.

According to one embodiment, the input value is interpreted according to predetermined rules. For example, the interpretation may be made according to the values in Table I below.

TABLE I

Exemplary Mapping of Input Values to Boot Operations

| Binary number formed by bits BN0 and BN1 | Operating system booted | Application within operating system launched at startup |
|---|---|---|
| 0 | Primary | General user interface |
| 1 | Appliance mode | Quick-viewing of PIM |
| 2 | Appliance mode | Email download |
| 3 | Appliance mode | Database upload and download |

In this embodiment, in the case where the detected binary input value is 1 (binary "01"), 2 (binary "10"), or 3 (binary "11"), specifying the boot into the appliance mode, there is a mechanism in which the appliance mode executes a specified activity. In one embodiment of this mechanism, a single dispatcher program is specified to always execute when the appliance mode is booted. This dispatcher executes the machine instruction {in register, portnumber} as was executed by the boot loader described above, and dispatches one from a selection of possible dedicated automatic programs based on the value it reads.

In a different embodiment, the program code for a dedicated activity is linked with its own instance of the appliance mode operating system, to produce separate binaries combining operating system and dedicated application logic into individual appliance mode executables, with one per appliance mode activity. In this case, the boot loader described above can be the sole determiner of the appliance mode activity to be executed, by the boot loader choosing one from among several instances of these binaries.

We refer to the value in the first column of the Table I most generally as a boot control indicator, as in different embodiments of the invention this indicator may be provided by some electrical (or optical) signal, or as a boot control value. In the embodiment described above, the boot control indicator is derived from the value of electrical signals generated by a control switch or logically compatible hardware, such as the autonomous boot initiator. Other means of generating the boot control value and conveying it to the executing CPU at boot loading or appliance mode startup time as described above, are possible. For instance, another embodiment may store the boot control value in a defined physical location on a defined storage device accessible at boot time and by both or all participating operating systems reading the storage device at the device level, such as a fixed location on the boot blocks of the primary hard disk. One operating system session in such an embodiment can influence the nature of the next session, namely which operating system and which dedicated application to execute automatically, based on what boot control value is stored by the session before it terminates.

Figure 3:
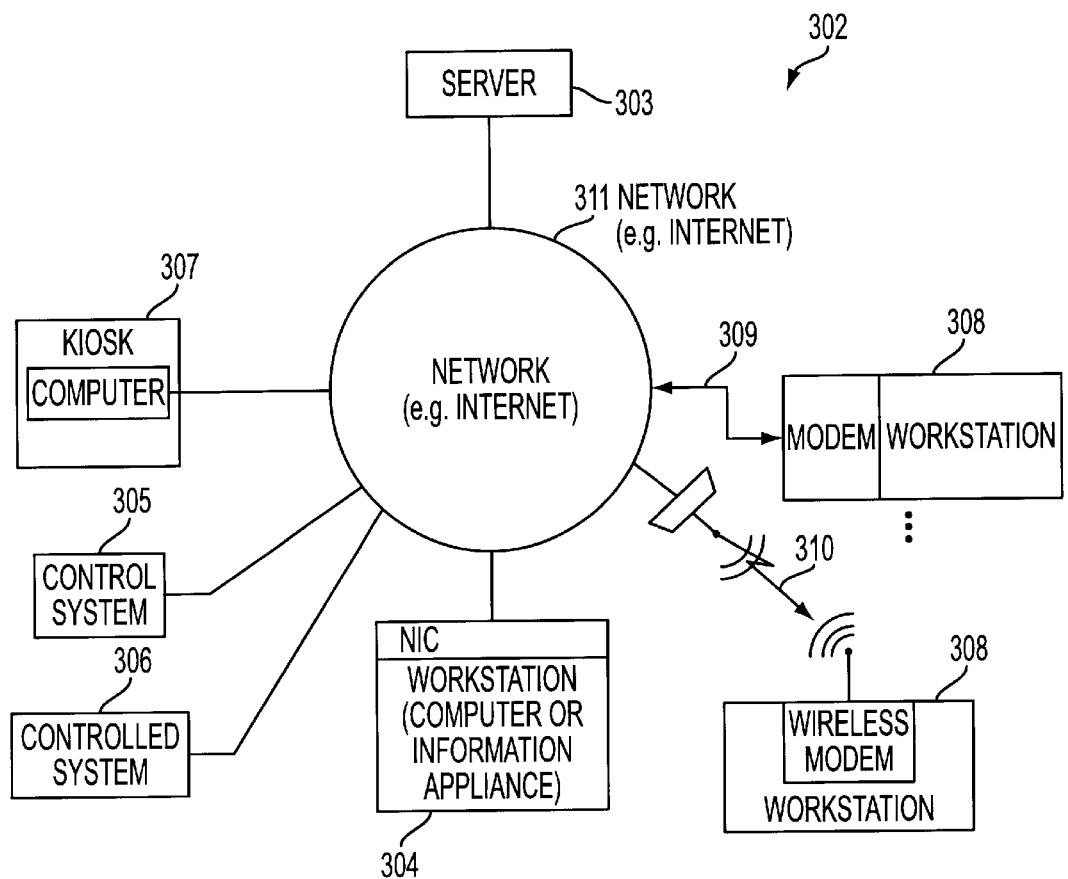
FIG. 3 is a diagrammatic illustration showing a block diagram of an exemplary interconnected network of computers and information appliances including servers, workstations, control systems, controlled systems, kiosks, and other servers or systems; each of which may incorporate or interoperate with the inventive structure and method.

We now describe an exemplary interconnected network 302 of computers and information appliances relative to FIG. 3. The interconnected network 302, may for example include network servers 303, workstations 304, control systems 305, controlled systems 306, information kiosks 307, and other workstations, servers or systems 308, one, some, or all of which may incorporate or interoperate with the inventive structure and method. Wired 309 or wireless 310 connections to the network 302, such as to the Internet 311 are supported. Details of the interactions between computers and information appliances incorporating the inventive structure are described in detail elsewhere in the application, as are the interactions with other components of the network.

FIG. 4 shows a typical PC with hardware boot control selector enhancement. The user model for such a PC is as follows. The user starts with the PC being in the powered-off state, and to use the PC normally with the primary OS, the user puts the Boot Mode Selector in position BSa and powers on the PC using the Power-On Button. If instead, if the user wishes to boot into and use one or more appliance modes (which can be differentiated), the user places the Boot Mode Selector in a position other than BSa prior to hitting the Power-On Button.

FIG. 4 shows an implementation of this procedure based on conveying the boot mode selection to the PC system via a parallel binary data channel, such as the I/O data port on x86 processors. An I/O multiplexer as is known in the art is assumed to be present, which maps the binary encoded byte (of which we depict just 2 bits to represent 4 modes) to a specific I/O address in the I/O port address space. In this mode, code that runs during the boot process can execute the x86 machine instruction {in accumulator, portnumber} to read in a binary encoding of the boot mode selection. FIG. 4 illustrates an embodiment having minimal logical depiction as those workers having ordinary skill in light of the description provided here will appreciate that there are many practical alternative implementations that perform the same basic logic.

For the serial input implementation, those workers having ordinary skill in light of the description provided here will appreciate that certain serial input bit timing issues must be addressed, however, serial bit transmission and processing are known in the art and not described here in detail.

Figure 5:
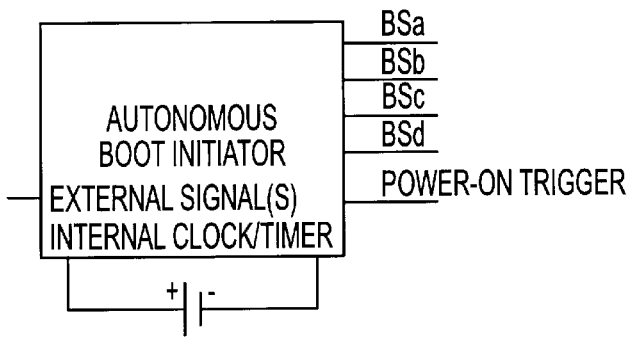
FIG. 5 is a diagrammatic illustration showing a depiction of an autonomous boot initiator.

The addition of such a boot mode selection model also enables autonomous selection and initiation of computer activity starting from a powered-off state. FIG. 5 depicts an Autonomous Boot Initiator, a self-powered (for example, a battery-powered) component which is compatible with the system of FIG. 4. The role of the Autonomous Boot Initiator is to assert a signal on one of the lines BSa–BSd and pulse a signal on the Power-On Trigger line, acting independently of the power state of the PC system.

One embodiment of the Autonomous Boot Initiator is clock or timer based, where the states of BSa–BSd and the triggering of a Power-On Trigger signal are determined by a countdown or absolute time and date. For instance, it may be programmed to assert a BSb during 4:00:00 AM through 4:01:00 AM (assuming that the reading of this signal by the PC will be within this minute) and to send a Power-On Trigger signal at 4:00:01 AM. This would have the effect of causing the PC to automatically initiate an appliance mode activity associated with BSb at about 4:00 AM every day.

A second embodiment of the Autonomous Boot Indicator is one which monitors one or more external signals and determines the state of BSa–BSd and a Power-On Trigger pulse based on the processing of the external signal(s). For instance, the external signal could be generated by an additional component which monitors a digital wireless network for specific data, such as a notification of new data available at a service, which the PC should retrieve by booting into an appliance mode dedicated to such a download task.

Figure 6A:
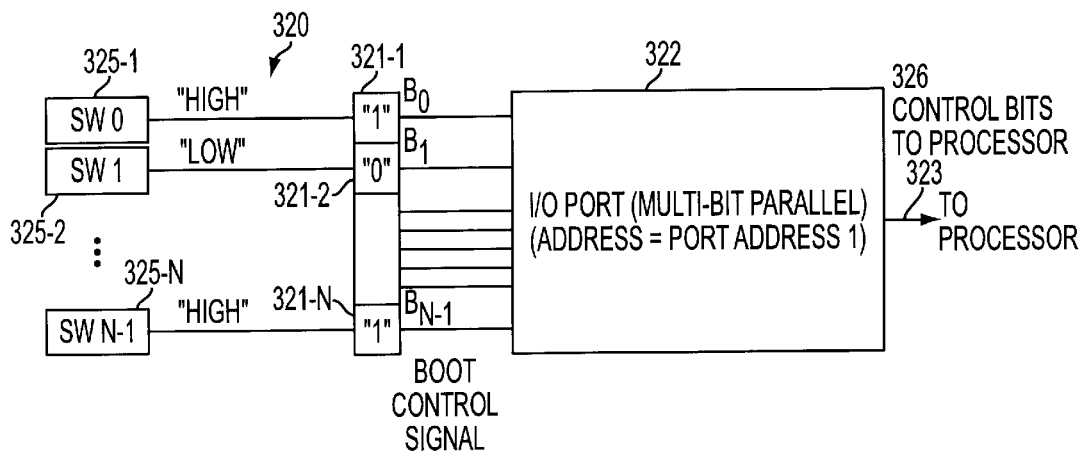
FIG. 6A is a diagrammatic illustration showing a first exemplary switch for generating boot control bit values at an input/output port that can be read by a computer during its boot operation and thereby control which of a plurality of available operating systems is booted by the computer.

FIG. 6 illustrates two exemplary embodiments of the manner in which boot control may be accomplished. FIG. 6A shows a first exemplary switching device 320 for generating boot control bit values 321 at an input/output port 322 that can be read by a processor 323 within a computer or information appliance 324 during its boot operation and thereby control which of a plurality of available operating systems is booted by the computer. In this embodiment, one or a plurality of switches 325 are set to generate a logical "high" or a logical "low" voltage level which is read by the processor 323 at an I/O port 322 as one or more control bits 326. (For instance, SW0 and SW1 could be generated by the encoder generating values BN0 and BN1 from FIG. 4.) The control bits 326 are associated with a boot decision, such as which of two or more operating systems to boot when booting is to be initiated. In this case the I/O port 322 is a parallel type port where the bits are available simultaneously.

Figure 6B:
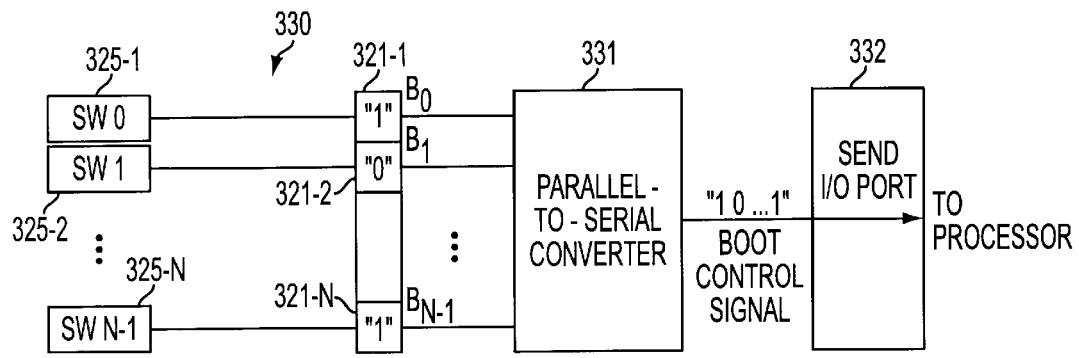
FIG. 6B is a diagrammatic illustration showing a second exemplary switch for generating boot control bit values at an input/output port that can be read by a computer during its boot operation and thereby control which of a plurality of available operating systems is booted by the computer.

FIG. 6B shows a second exemplary switching device 330 for generating boot control bit values 321 in a serial manner at an input/output port 332 that can be read by a processor 323 within a computer 324 during its boot operation and thereby control which of a plurality of available operating systems is booted by the computer. This embodiment provides a parallel-to-serial converter to convert a plurality of essentially parallel bits or signals into a serial stream.

Figure 7:
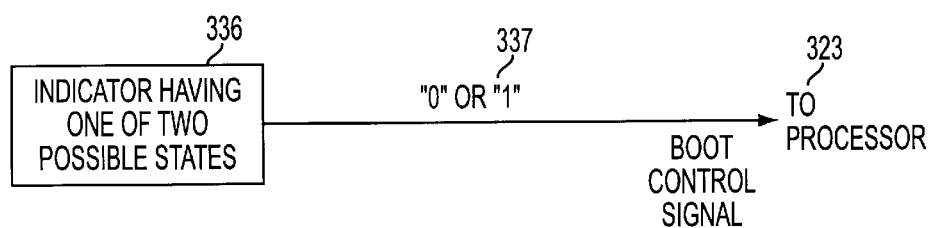
FIG. 7 is a diagrammatic illustration showing a device that generates a binary boot indicator flag (or flags) as a boot control indicator that can be read by a computer during its boot operation and thereby control which of two (or more) operating systems is booted.

FIG. 7 is a diagrammatic illustration showing an even more general device or logic element 336 that generates a binary boot indicator flag (or flags) 337 as a boot control indicator that can be read by a processor 323 within a computer or information appliance during its boot operation and thereby control which of two (or more) operating systems is booted. Those workers having ordinary skill in the art in light of the description provided here will appreciate that other electrical circuits and or logic may be used to accomplish the boot control signal or control bit generation.

Figure 8A:
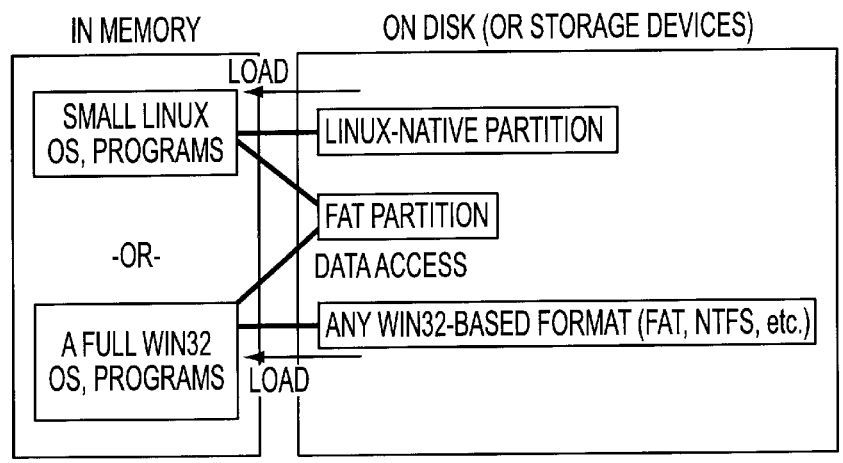
FIGS. 8A–8C are diagrammatic illustrations showing for a fast view type operation, the interactions between a secondary operating system on a secondary storage device partition, a primary operating system on a primary partition, files on a partition that is compatible with both primary and secondary operating systems, and memory with a computer or an information appliance.
Figure 8B:
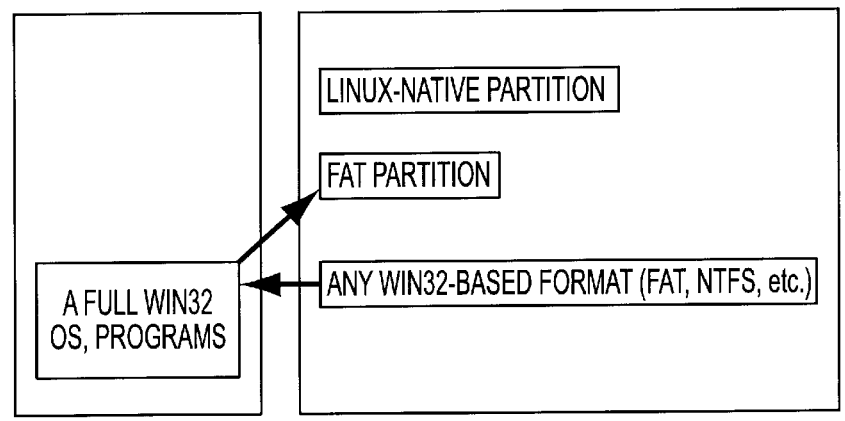
Figure 8C:
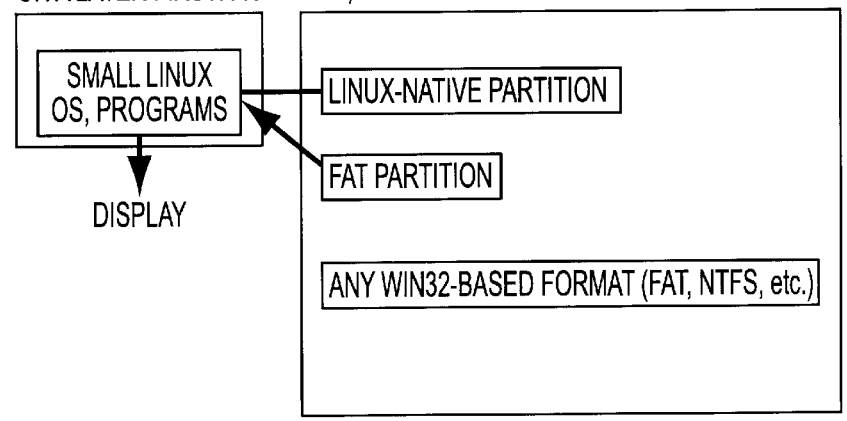

We now describe aspects of the inventive structure and method relative FIGS. 8A–8C which are diagrammatic illustrations showing the interactions between a secondary operating system on a secondary storage device (in this example, a hard disk drive) partition, a primary operating system on a primary partition, files on a partition that is compatible with both the primary and secondary operating systems, and memory coupled to a processor within a computer or an information appliance. For purposes of this description, it is assumed that an OEM computer maker sets up a single hard disk drive to provide a secondary partition storing a small fast-booting Linux operating system, a compatible partition utilizing a File Allocation Table (FAT) file structure, and a primary or major operating system partition storing any WIN32-based Format. As illustrated in FIG. 8A, Either the Linux operating system from the secondary partition or the WIN32 based operating system from the primary partition may selectable be loaded into memory of the computer for execution. The FAT partition is conceptually the "compatible" partition—one in a format that is guaranteed to be accessible in both Windows Win32 and Linux environments independent of the optimizations made in formatting schemes to serve the Windows and Linux operating systems.

FIG. 8B illustrates the selective loading of the primary Win32 based operating system from the primary partition into the memory along with any application programs that are to be executed within that operating system environment. In the example illustrated here, an agent program runs in Win32 to prepare information that will be available to the secondary operating system or an application program executing within the secondary operating system environment when the computer is later operated in the secondary operating system environment. This secondary operating system environment is also referred to as the first page operating system environment when implemented to provide a fast booting operating system that is rapidly available to a user as the first screen when the computer completes its boot, such as for example as a personal information manager (PIM). It is alternatively referred to as a fast boot more or appliance mode operating system for other operating scenarios, such as for example during unattended file transfers, as described elsewhere in the specification.

As illustrated in FIG. 8C, an a later first page, fast boot, or appliance mode boot, where the secondary Linux operating system and its application programs are loaded from the disk into memory, the information stored in the compatible partition is available for viewing.

FIG. 9 diagrammatically illustrations the manner in which a personal computer, including an original equipment manufactured (OEM) computer implementing the inventive structure and method, is booted into a dedicated fast boot (or appliance mode) environment to execute a program that downloads critical information from a source which is stored (or cached) into a two-operating system compatible storage partition and available for use during operation of the same computer running in a second operating system environment even when connection to the source is no longer possible.

Figure 9A:
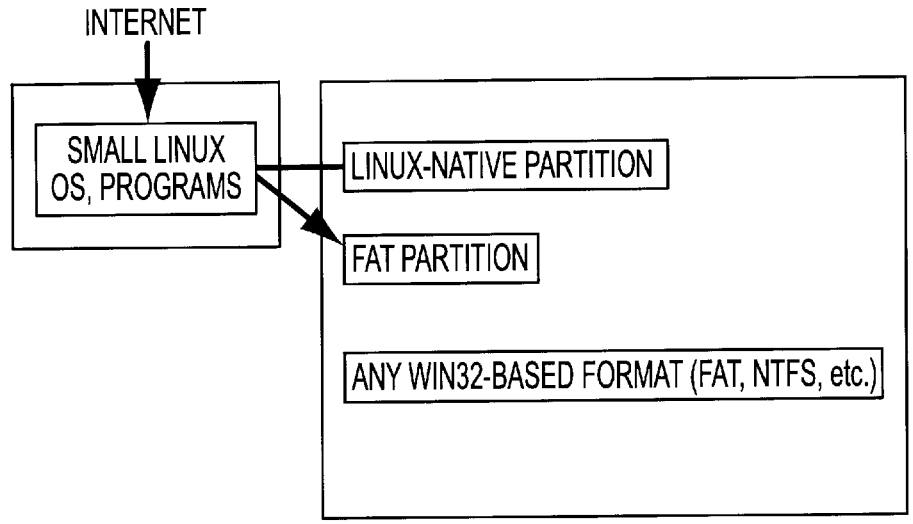
FIGS. 9A–9B are diagrammatic illustrations showing the manner in which a personal computer, including an original equipment manufactured (OEM) computer implementing the inventive structure and method, is booted into a dedicated fast boot (or appliance mode) environment to execute a program that downloads critical information from a source which is stored (or cached) into a two-operating system compatible storage partition and available for use during operation of the same computer running in a second operating system environment even when connection to the source is no longer possible.
Figure 9B:
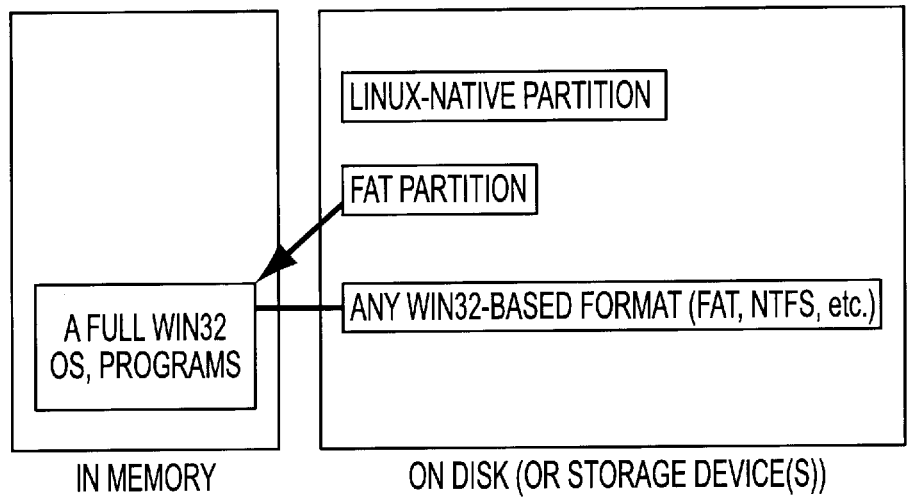

In FIG. 9A, the secondary operating system, such as a small Linux operating system, is booted from a cold-boot, and either the operating system and/or an application program or programs executing within that operating system establish communication with an external system such as a server on the Internet. The dedicated environment of the secondary operating system downloads the critical information which is cached in the FAT or other multi-operating system compatible partition. The information is thus made available during normal working mode (e.g. the primary operating system mode) of the computer, even though the computer may not be connected to the internet at that later time, as illustrated in FIG. 9B. Note that the primary operating system later loads and accesses the downloaded information.

Figure 10:
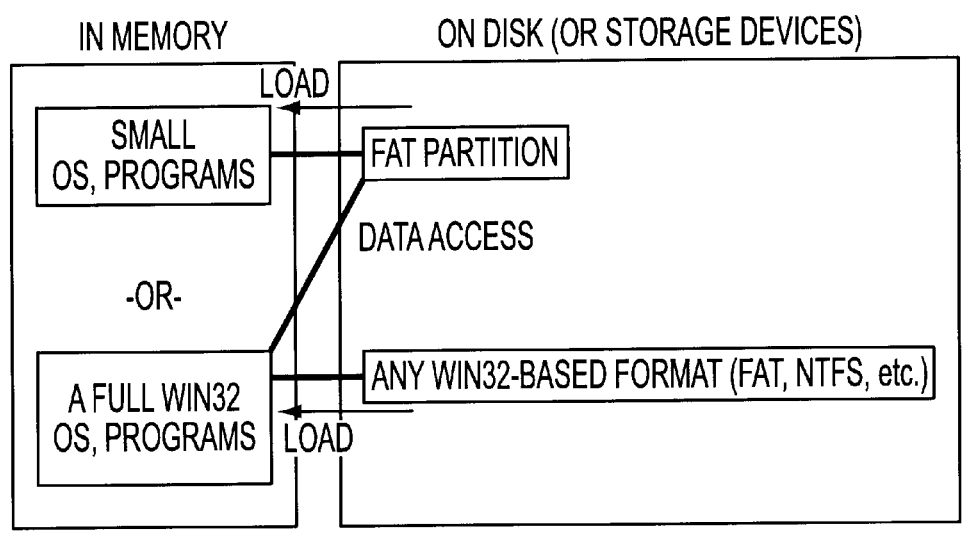
FIG. 10 is a diagrammatic illustration showing an embodiment of a two partition configuration in which a first partition stores a first operating system and a second partition stores a second operating system and provides compatible storage so that data may be shared between both operating systems or between application programs executing in the two operating systems.

FIG. 10 is a diagrammatic illustration showing an embodiment of a two partition configuration in which a first partition stores a first operating system and a second partition stores a second operating system and provides compatible storage so that data may be shared between both operating systems or between application programs executing in the two operating systems. This configuration operates in a manner analogous to that already described except that only two partitions are required. One partition stores the secondary operating system and the FAT or compatible file structure, while the second partition stores the primary operating system.

Figure 11:
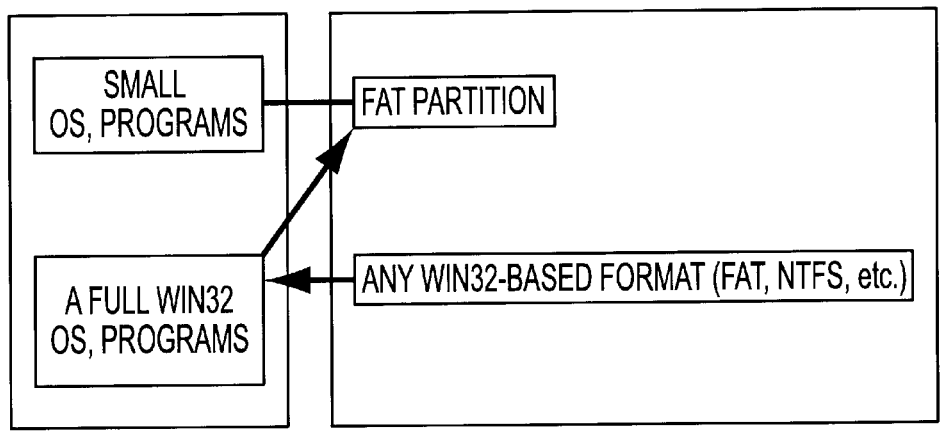
FIG. 11 is a diagrammatic illustration showing the manner in which an agent program executing in the primary operating system according to the two-partition case of FIG. 10 prepares data so that it is available to a secondary fast-boot (or appliance mode) operating system at a later time.
Figure 11:
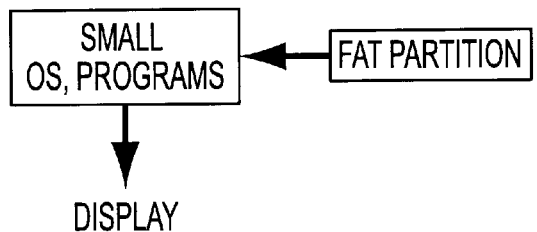

FIG. 11 is a diagrammatic illustration showing the manner in which an agent program executing in the primary operating system prepares data so that it is available to a secondary fast-boot (or appliance mode) operating system at a later time. Then during that later session, such as during a FirstPage or appliance mode boot, the data obtained by the agent is available for further processing and/or viewing.

Figure 12:
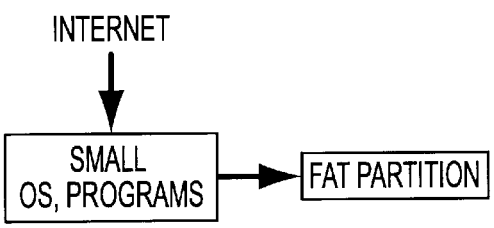
FIG. 12 is a diagrammatic illustration showing the manner in which a personal computer or information appliance is made to cold-boot into a dedicated small fast-booting operating system environment according to the two-partition case of FIG. 10 to run a program that downloads critical information from the internet which is cached in a compatible partition, such as a compatible FAT format partition, and thereby available for later access even when not connected to the Internet.
Figure 12:
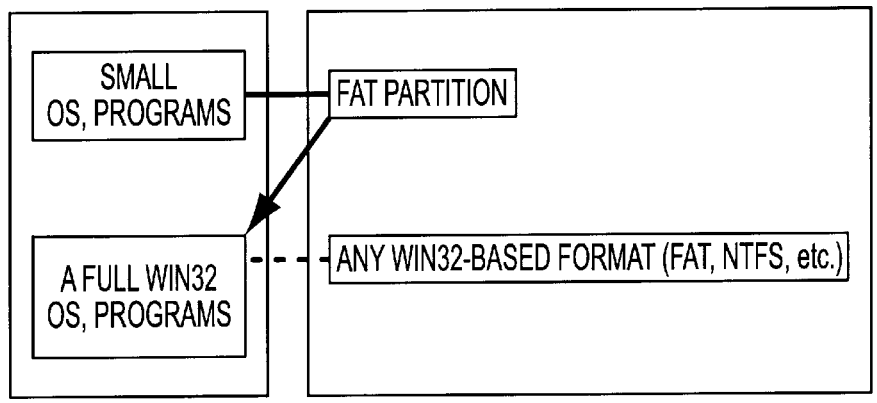

FIG. 12 is a diagrammatic illustration showing the manner in which a personal computer or information appliance is made to cold-boot into a dedicated small fast-booting operating system environment to run a program that downloads critical information from the internet which is cached in a compatible partition, such as a compatible FAT format partition, and thereby available for later access even when not connected to the Internet. In this scenario, the information obtained during operation in the secondary boot mode is available to the normal working mode of the computer at a later time, even if the computer is not then connected or connectable to the Internet.

Before describing several exemplary applications of the inventive structure and method, we now briefly describe aspects of the form of the data storage in the compatible partition. We provide this description by way of illustration in the context of a fast or rapid boot operation to a personal information manager (PIM) type application program, also referred to as the FirstSite application program. The FirstSite application program or feature is within the class of operations intended for the fast boot or appliance modes of operation. While in the example to follow, the database features are described relative to a DOS or DOS-like secondary operating system and a Microsoft Windows WIN32-type primary operating system, the data base features are applicable to other types of primary and secondary operating systems as well. For example, to the other operating systems described herein including to Microsoft Windows, Linux, Unix, and the like.

Two alternative approaches for sharing databases between application programs and/or operating systems that may be used with embodiments of the invention described here, also referred to as "data tunneling," are described in co-pending U.S. Utility patent application Ser. No. 09/406,048 filed 27 Sep. 1999 for *System And Method For Achieving Rapid Operating State of an Application Program in a General Purpose Computer Device*, and herein incorporated by reference.

Having described some of the features of various configurations at a top level, we now describe a number of exemplary embodiments in much greater detail. These examples applications of the invention are merely intended to illustrate the applicability of the inventive structure and method and not to limit the scope of the invention.

EXAMPLE APPLICATION No. 1

Dedicated Mail Upload/Download Activity

Figure 13:
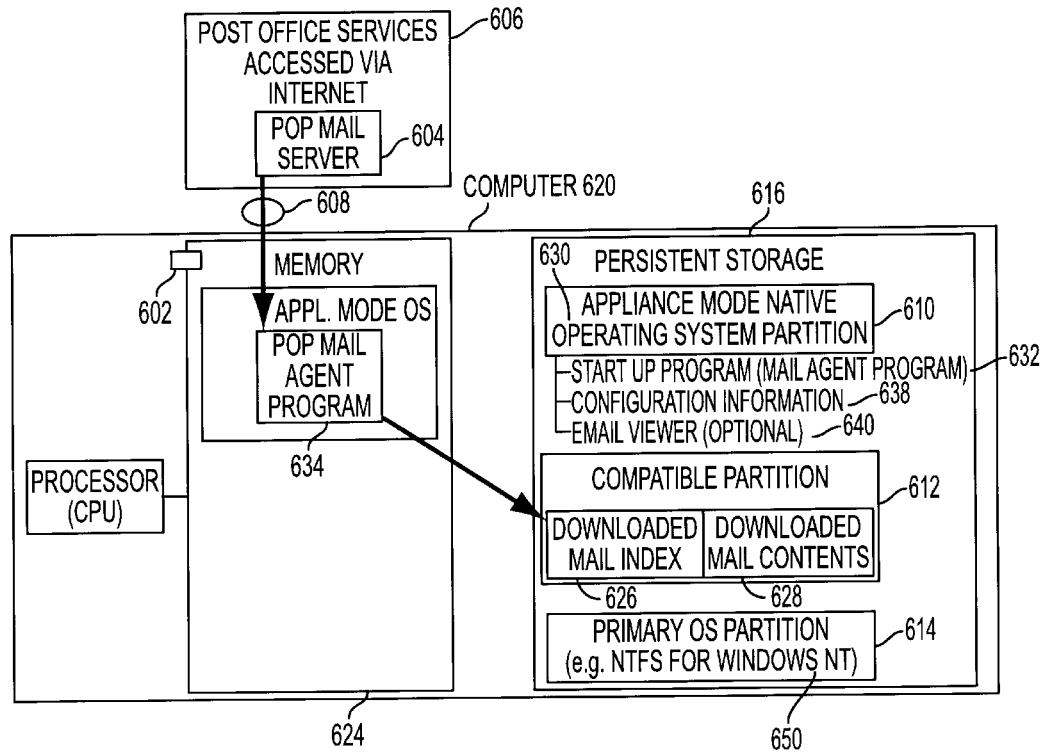
FIG. 13 is a diagrammatic illustration showing an embodiment of the invention adapted for downloading email from an internet server by a fast boot (or appliance mode) operating computer system which stores the email in a compatible partition for use by a primary operating system at a later time.
Figure 14:
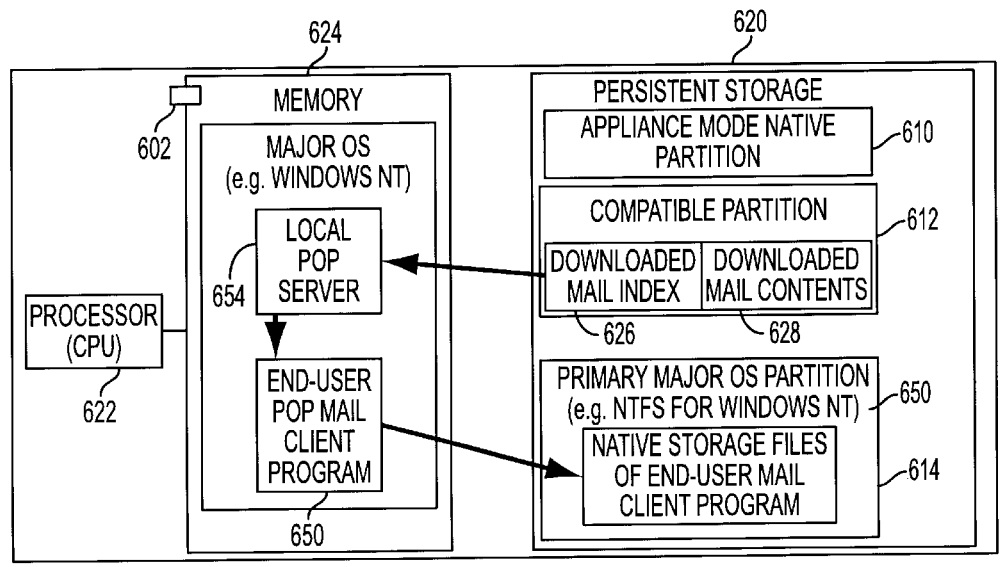
FIG. 14 is a diagrammatic illustration showing an embodiment of the invention adapted for acing email in a compatible partition that was earlier downloaded from an internet server by an appliance mode operating system.

We now describe an example activity, specifically a dedicated data or email download and/or upload activity, supported by the inventive system and method with respect to the diagrammatic illustrations of FIG. 13 and FIG. 14. This example is one in a class of applications that involve network information or data transfer during the information appliance mode of operation. Recall that the term "information appliance mode" (IA mode) or simply "appliance mode" as used here refers to the fast boot mode of operation using the small fast loading secondary operating system. Also, recall that while this system or device may be or include a conventional computing device such as a desktop computer, a notebook computer, a personal data assistant (PDA), a mobile telephone, or other fixed or portable communication device, it may also be a component in a building, a home appliance, an automobile or truck, or any one of a number of other systems and devices that benefit from the upload or download of information, including electronic mail or data or information in a more general sense. Mechanisms that enable unattended launch and execution of the appliance mode such that the information appliance is booted into an operational mode and operating system environment that provides for unattended upload or download of information are described elsewhere herein.

The particular exemplary dedicated mail download application 601 described here is directed to a particular appliance mode operation that executes the download of a user's email 602 (or other electronic communication, data, or content) from a POP mail server 604 of a post office service 606 (or other provider of the communication) accessed via the Internet 608 (or other remote source, origin, or intermediary of the communication).

For the purposes of clarity of description, but not limitation, several assumptions are made in the description that follows relative to characteristics of the involved logical components. First, it is assumed that the post office service 606 accessed on the Internet 608 is or includes a POP mail server 604, which is a common type of Internet post office service. Second, it is assumed that the appliance mode native operating system (secondary operating system) partition 610 is implemented with a version of the Linux operating system, and that the compatible partition 612 is in FAT file compatible format. Third, it is assumed, that the primary operating system partition 614 is Microsoft Windows NT (such as for example, Microsoft Windows NT 4.x or Microsoft Windows NT 2000), and that it's main non-volatile or persistent storage device 616 (here a hard disk drive) partition is in the NTFS format. Finally, it is assumed that the end user 618 utilizes Microsoft Outlook 97 mail application program 620 to access email 602 in the primary Windows NT operating system environment. These assumptions are made to merely to provide a concrete example and avoid the necessity of describing the variations that would inevitably arise at each stage of the discussion if a more generic set of elements were used and that might tend to obscure the inventive structure and method. Options for each of the components assumed in this example are described elsewhere in the specification.

Procedural steps for the inventive procedure 400 are now described relative to FIG. 13 and FIG. 14. Reference to email 602 generally means email in the conventional sense where, for example, a textual message with optionally attached files, graphics, sound, multi-media or the like are transmitted as a electronic mail package; as well as the more general class of electronic communication and content provision. Initially, one or more email 602 intended for the end user 618 is waiting at the user's POP or other mail server 604 which may be accessed through a connection to the Internet 608.

The computer or information appliance (also referred to here as the system) 620 includes a processor 620, a fast memory 624 such as RAM coupled to the processor, and a non-volatile or persistent storage device 616 also coupled to the processor. In this embodiment, the persistent storage device 616 includes three partitions: (i) an appliance mode partition containing a fast boot compact native operating system, such as for example a minimal Linux operating system and an automatic startup program 632 such as a mail agent program 634; (ii) a compatible partition 612 into which a downloaded mail index file 626 and downloaded mail contents file 628 will be written during the mail download; and (iii) a primary operating system partition 638 utilizing, for example a Microsoft Windows NT operating system.

Aspects of operation of the inventive system are now described relative to several method or procedural steps. Reference numerals are provided for these steps for convenient reference even though not shown in the drawings. First, the computer or information appliance 620 is started in appliance mode (Step 401), using for example, the timer-based and hardware control mechanisms described elsewhere in this specification. Next, the appliance mode operating system 630 (here for example, the Linux operating system) is loaded from the appliance mode partition 610 in the system's memory 624 (Step 402). The appliance mode operating system runs the automatic startup program 632 (Step 403). This startup program 632 may, for example be the POP mail agent program 634 described in Step 404 below. Alternatively, the startup program 632 may be a dispatcher program 636. A dispatcher program senses the launch configuration input, described elsewhere in this specification, and launches a second program based on the input. For this example, the dispatcher program may read a configuration to execute the mail download activity. It is noted that the primary operating system 650 stored in the primary partition 614 does not load or execute during the appliance mode operation.

The mail agent program is then loaded into memory 624 from the appliance mode partition 610 (Step 404). This mail agent program reads any required configuration information 638 from the appliance mode partition 610, such as information about how to access the Internet, find the mail service, and identify the user to it. This could include a selected method of accessing the Internet (such as whether one dial-up Internet provider should be used instead of another, or if LAN access should be used instead), provide, the name of the POP server, and username and password information. This example assumes that the secondary operating system provides TCP/IP access to the Internet, which is common in most modern operating systems including appliance targeted ones; such an environment would be configured with physical access information like dial-up phone numbers and TCP/IP-related parameters such as name server and gateway addresses.

The mail agent program in memory downloads the users email 602 and stores it in the compatible partition 612 of the computer of information appliance 620 (Step 405). A common format for this, known to those skilled in the art, is to create or append to a sequential file of mail contents and to create or append to a sequential index file. The mail contents file 628 contains the complete headers and body of, for example, a RFC822 format mail message entities, concatenated sequentially in one file. The email message structure, typically a RFC822 format, is merely exemplary and the invention is not limited to any particular message type or format. The mail index file 626 is a sequence of records where one record corresponds to one message in the mail contents file 628. Each record in the index file 626 contains the offset of the corresponding entity in the mail contents file 628 from the beginning of the file. The record may also contain other information regarding the reception of the message, for example information other than the RFC822 message entity passed during the POP transfer of the message from the POP server, to facilitate the complete data transfer described here.

Once these steps (Steps 401–405) are completed, the email has been downloaded into the computer and the appliance mode is finished and is free to power down the system (Step 406). The end user 618 may choose to view the mail in the appliance mode and in such situation an optional email view or browser 640 executing within the appliance mode would be loaded into memory and executed during operation in the appliance mode.

With respect to FIG. 14, at any later time, the user boots the computer or information appliance 620 into the primary operating system mode, here for example, into the Microsoft NT operating system mode. In this primary operation system environment, access to the mail which was downloaded in the steps described above may be provided by a dedicated graphical application program which is designed to understand the mail contents and index files described above, and which shows just the mail downloaded in appliance mode. As an illustration of our inventive structure and method, we describe an alternative implementation which uses an existing email client application like Microsoft Outlook 97 for the ultimate display of the received mail. This allows us to focus our description on the data handling provided by the inventive structure. It also provides a usage model where the mail downloaded in appliance mode can be integrated into the normal email usage experience of the primary operating system usage.

The primary operating system 650 loads into memory 624 from the primary operating system partition 614 (Step 407). The primary operating system 650 executes a background service 652 (Step 408) which loads into memory and runs a local POP server 654 accessible on the local host computer 620 as a POP protocol server running on the port number as defined and recommended by Internet standards. Such Internet standards as of April 2000 are known in the art and not described in detail here. POP protocol port number is a standard TCP/IP mechanism known by workers having ordinary skill in the art. In simplified terms, the use of the port concept is a way of sub-structuring different simultaneous communication to and from a single host into different logical channels.

The end-user mail client program 660 is desirably configured with an additional (for example, second) mail inbox service account 662 to access the local POP server 654 (step 410). The existing normal inbox service account configured in the mail client is assumed to be the same service and account that was used to configure the appliance-mode mail download agent described above. This existing account could be left intact and active, with a usage which will be explained below, or it can be removed. This service account configuration could be done once manually by the end user 618 when he or she installs the end-user mail client program 660, or pre-configured by the manufacturer of the system 620 providing the inventive computer or information appliance and mail client program 660 as a pre-configured system. The user 618 invokes a command in the mail client program 660 to download new mail (Step 411) including utilizing the mail contents file 628 and mail index file 626 from the compatible partition 612 using the local POP mail server 654.

One of the POP server accounts processed by this will be the local POP server 654. The local POP server 654 serves the mail 602 previously downloaded from the POP mail server 604 into the compatible partition 612 during appliance mode operation based on the index file 626 and mail contents file 628 on the compatible partition 612, mimicking a real POP server and in a sense acting as a repeater for the real POP server 604 within post office services 606. This procedure integrates the mail downloaded in appliance mode in the mail client's program's inbox. This also has the effect of allowing the user to logically collect new mail into the mail client program's inbox even if the system is not connected to the Internet 608 (or other mail or content source) at the time the user invoked the command in the mail client program 660 to download new mail (Step 411).

If the mail client's service account list only includes the local POP server, then the mail download process is provided by the appliance mode mail download agent because the single regular download channel for receiving mail from the configured service provider, and one which can operate independently of the time when the user runs the primary operating system and the mail client program. Alternatively, the user may configure the mail client program with multiple accounts to access the local POP server and the Internet-based mail service account directly. In this latter mode of operation, the local POP service would provide mail to the mail client program which was downloaded during the previous appliance mode download session execution, and in addition the mail client can access the Internet-based mail service directly to access any new mail that has arrived since the last appliance-mode download execution. The benefit to the user is that messages which were available at the time of the previous appliance-mode download execution will become available in the primary operating system session in this way, even if the primary operating system session does not have Internet access and can't immediately download the very latest mail from the Internet.

As part of the collection of new mail into the inbox, a mail client program 660 will typically write into physical files associated with the program to store messages (Step 412). In the context of the described system, these physical native storage files generated by the end-user mail client program 664 will typically be located in the primary operating system partition in the manner that the end-user mail client program would conventionally store such files when downloaded directly from the POP mail server 604.

The appliance-mode POP mail client agent program 634 described in Steps 404–405 is a special program operating according to the needs of the above description. The functionality needed is defined by Internet standards, such as the Post Office Protocol (POP) mail protocol standard Version 3 (defined in Internet RFC 1939) and hereby incorporated by reference, which are known in the art and not described in detail here. Furthermore, in the Linux operating system environment, there are standard end user programs such as, for example, command-line POP mail clients and store-and-forward mail transfer agents such as SendMail or their equivalent. These standard end user programs are known in the art and may be used as is or may be modified by those workers having ordinary skill in the art to provide working designs and source code for those skilled in the art to serve the requirements of Steps 404–405. In analogous manner, the implementation of the local POP server 654 described in Step 408 is that of a standard POP server program, the internal implementation of which is within the skill of the ordinary worker in the field when provided with the description herein.

Another useful enhancement of this email methodology is to provide the local POP server 654 with the ability to access the Internet 608 directly when the system is connected to the Internet. Such an enhancement allows the primary operating system mail client program 660 to be configured only with connectivity to the local POP server 654. Mail previously downloaded into the compatible partition 612 is served as described above; but following that serve operation, if the local POP server 654 detects that it is connected to the Internet and can access the post office POP mail server 604, it can optionally be configured to access the user's POP mail server 604 on the Internet directly to receive mail 602 that the post office 606 has received after the last download in appliance mode.

The downloading and uploading of files, including email files, may be accomplished in the unattended file upload/download operating mode described in detail elsewhere in this specification.

EXAMPLE APPLICATION No. 2

Dedicated Data Upload and Download

Figure 15:
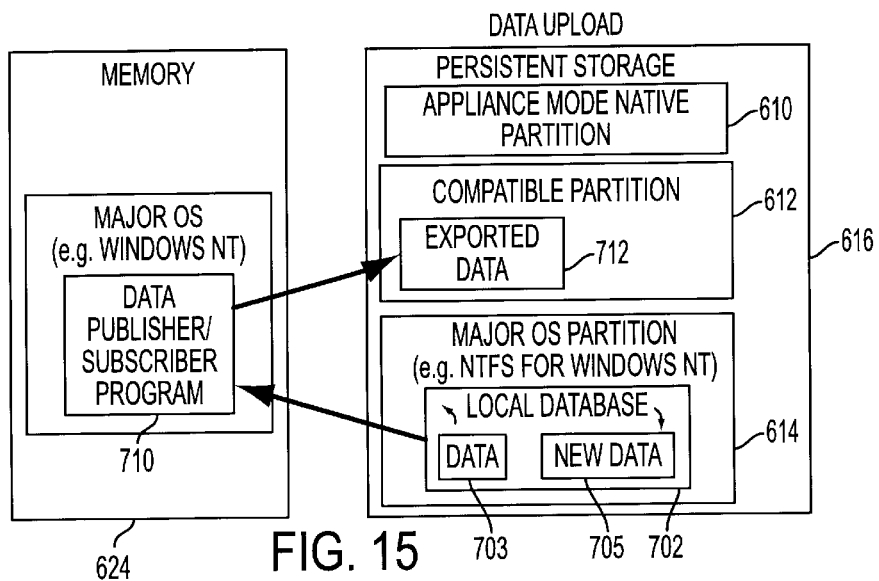
FIG. 15 is a diagrammatic illustration showing a first portion of an exemplary data upload operation from a primary operating system application program to a data cache or other data storage in a compatible partition.
Figure 16:
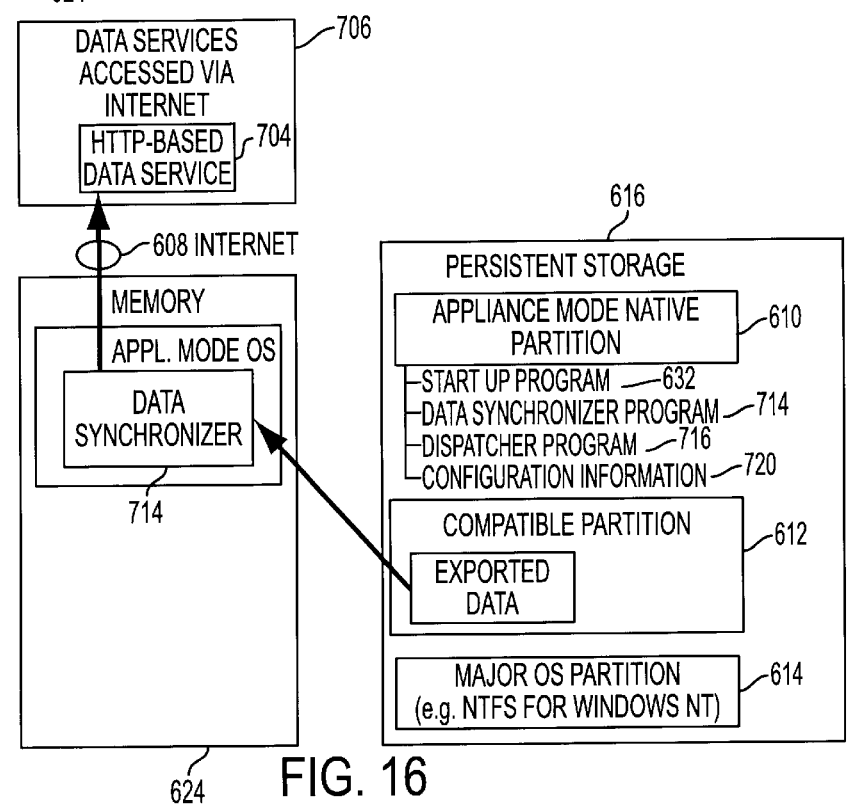
FIG. 16 is a diagrammatic illustration showing a second portion of the exemplary data upload operation in FIG. 15 further showing the final stage of uploading by the appliance mode operating system from the compatible partition to the Internet.

We next describe an example of another activity supported by the computer or information appliance (the system), which is also representative of a class of applications that involve network data transfer during the appliance mode. This example is described relative to FIG. 15 and FIG. 16.

This example is illustrative of a capability that allows the inventive system to collect data during execution of programs in the primary operating system mode. More specifically, the inventive structure and method allows such system to be programmed to upload the collected data to a remote data service using the benefits of appliance mode execution. For instance, with appliance mode execution, the system may be programmed to meet a strict data or other content update delivery schedule even if the system is turned off and unattended at the time of the scheduled update. This methodology is also extendable to applications having converse data flow, that is to applications of a data service located on the Internet (or other data or content provider) that wishes to provide downloaded data from a source connected to the Internet to the system.

Again, certain assumptions are made for the purpose of clearer exposition of the inventive structure and method. These assumptions are not intended to limit the scope of the invention or the applicability of the inventive structure or method to alternative hardware, software, operating systems (OS), networks of distributed computing systems, or other components, as such modifications and extensions will be readily apparent to workers having ordinary skill in the art in light of the description provided herein.

This description of the inventive procedure 450 therefore assumes the presence of a local database 702 stored on the primary partition 614 and managed in the system's primary operating system mode 650. For instance, the primary operating system mode 650 may be a Windows NT mode and the local database 702 may be a local database managed by a database management application program 704, such as the Microsoft Access database program (for example, the Microsoft Access 2000 program). In the absence of such existing local data base 702, a local database is created in conventional manner (Step 431). This description also assumes that the local database 702 has already been populated with data during the operation of the database management program (e.g. Microsoft Access 2000) by the user in the primary OS mode of operation. (In the event the database has not been populated, such data may be provided to the database for subsequent use (Step 432).) Finally, this description assumes that there is a data service 706 access via the Internet 608 (or some other communication link or means) which is interested in receiving the data 703 that is present in the system's local database 704; and, the data service 706 may also have new data 705 which it wishes to integrate into the local database 702. In this example, the data service 706 is made accessible on the Internet via an HTTP-based data service 704 using HTTP protocol which is well known in the art and not described in greater detail here.

To provide additional context for this dedicated data upload and download example, we consider the specific scenario in which the system 200 is a laptop computer carried by a corporate data collector end-user 618 who goes in the field, disconnected from the Internet 608, to input information into a Microsoft Access data view. At the end of the working day, the user 618 only needs to connect the laptop computer with an installed modem (or other communication device) 707 to a telephone line (or other communication channel or link) 708 to have the data 703 published to the corporate service overnight. The overnight synchronization operation provided by a data synchronizer program resident in the appliance mode native partition 610 and loaded into memory 624 for execution can also pick up new data 705, such as updated pricing information or supply conditions, which can be incorporated into the laptop computer's local database 702 to influence the user's next day of work. With this operational context in mind we now describe procedural steps in the inventive method that accomplish this functionality.

A sequence of procedural steps applicable to an embodiment of the inventive method 450 for dedicated data upload/download are now described. The system is initially operating in the primary OS mode (Step 451) and a data publisher/subscriber program 710 stored on the primary partition 614 and executing in memory 624 runs in the background (Step 451*b*). The primary OS 650 could for example be Microsoft Windows NT (or any of the other alternatives described elsewhere herein) and the data publisher/subscriber program 710 could be a Windows NT service, that is a program that is started automatically by Windows NT and runs continuously in the background.

The data publisher/subscriber 710 program's function is to regularly perform the following tasks. It reads data 703 in the local database 702 and it creates or updates an "exported data" file 712 on the compatible partition 612 (Step 451*c*). As a simplification for the purposes of this discussion, it is assumed that the exporting of the database 702 exports the complete database including all of the data 602 in it, and an update to the exported data file 712 means that it is completely overwritten. Elaborations and alternatives to this overwrite procedure are of course possible which limit the exporting of data 702 to only those data elements that have changed through the use of additional logic and/or programmatic elements. Means for identifying changed data are known in the art and not described here.

There are many means possible for representing the state of a database as a file. One class of such means is the idea of using Extensible Markup Language (XML) or variations and extension thereto, as a file format to represent the state of relational or other databases. XML and extensions and modifications thereto are known in the art and not described in detail here, as neither the type of data nor the form of the database organization are restricted by the inventive structure or method. The technique for representing databases is exemplified by W3C work such as "XML Representation of a Relational Database" (See for example, http://www.w3.org/XML/RDB.html as of 29 Feb. 2000) and the general mechanism is familiar to those skilled in the art. Where the database is in an XML representation, the result of the execution of the data publisher/subscriber program 710 in the primary operating system mode is the creation or update of an XML type exported file 712 in the compatible partition 712.

The data publisher/subscriber 710 has another responsibility, that of handling data flow in the converse direction, which is explained in later steps. The characterization of the name "subscriber" will also be made more clear by that description.

Once the exported file 712 or other form of the exported data is provided to or otherwise available in the compatible partition 612, the system 200 is shut down from the primary operating system mode in conventional manner (Step 452). At any later time, an appliance mode data upload process is initiated (Step 453), possibly in an unattended data upload/download manner, using the timer-based and/or hardware control mechanisms described elsewhere in this specification. The appliance mode operating system 630 is loaded from the secondary partition 610 into the system's memory 624 (Step 454), and the appliance mode operating system runs an automatic startup program 632 (Step 455). For this application, the startup program 632 may be the data synchronizer program 714 described in the next step, or alternatively, it may be a dispatcher program 716. A dispatcher program 716 senses the launch configuration input 718, for example the manner in which the boot control value determines what appliance mode application to execute, described elsewhere in this document, and launches a second program, such as the data synchronizer program 714, based on the input.

The data synchronizer program 714 is loaded from the appliance mode partition 610 (Step 456). This data synchronizer program may read any necessary configuration information 720 from the appliance mode partition 610, such as information about how to locate and access the data server 706 on the Internet 608. For example, this configuration information 720 may include an HTTP server URL of the data service. The data synchronization program 714 makes an HTTP POST request to the URL specified by its configuration (Step 457) and includes the complete contents of the exported data file 712 from the compatible partition 612 as the data stream part of the POST request. At this point, the data upload is complete, and the system is free to shut down (Step 458*a*).

Figure 17:
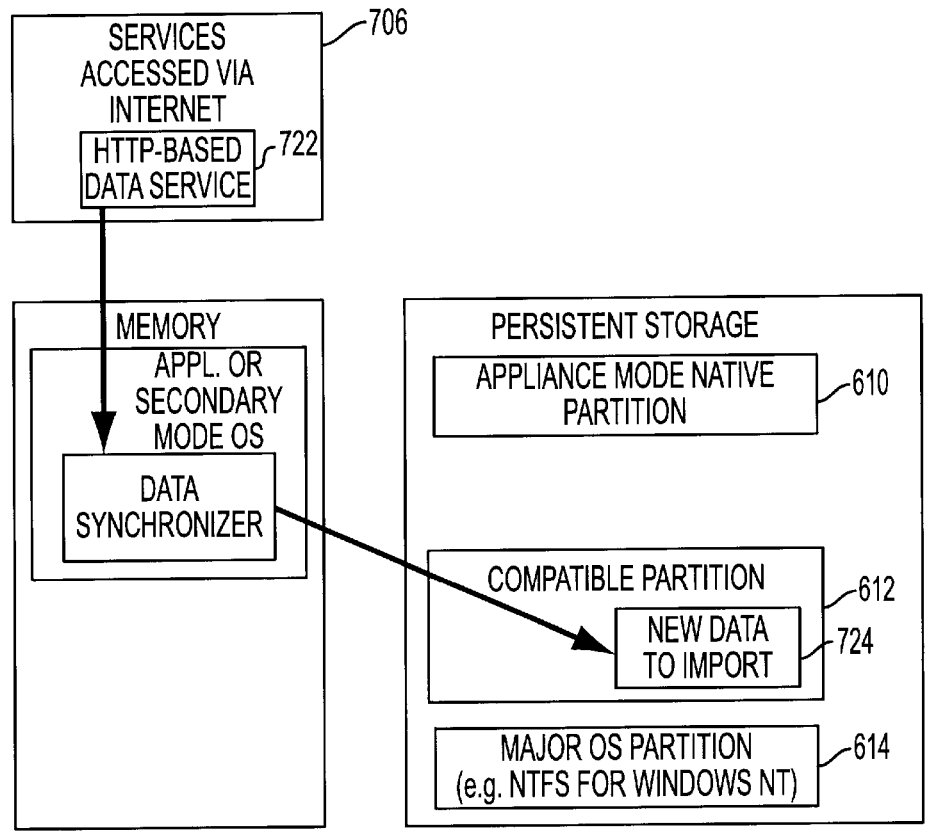
FIG. 17 is a diagrammatic illustration showing a first portion of an exemplary data download operation from the internet to a compatible partition in appliance mode.
Figure 18:
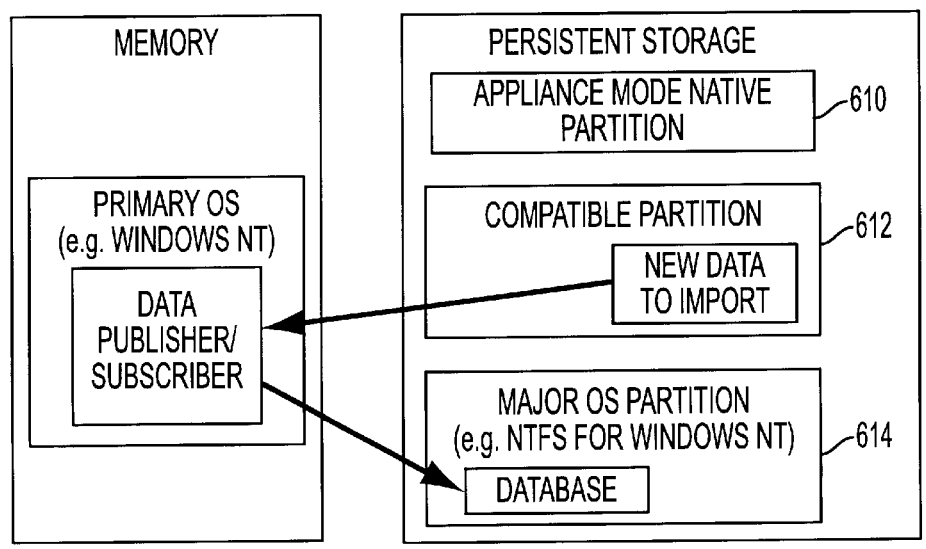
FIG. 18 is a diagrammatic illustration showing a second portion of the exemplary data download operation of FIG. 13 from the compatible partition to the local database in a primary operating system partition.

An alternative embodiment of this procedure 450 includes additional enhancements that provides an ability for the system 200 to receive new data 705 from the data service 706, such as an HTTP-based data service 722. We describe this variation relative to FIG. 17 and FIG. 18, as a continuation of the above steps starting just prior to the point, after the data upload is complete, and the system shuts down, that is prior to Step 458*a*. It should be understood however, that these steps may be used independently of the earlier steps when only new data is to be received. In this embodiment, after the data synchronizer 714 successfully fulfills the upload of data 703 with the POST request, it makes a GET request to a different URL which requests the download of new data, such as an XML stream encoding new data, to be integrated into the local database 702 (Step 458*b*). A POST request is part of the HTTP protocol, which is used to pass an arbitrary stream of data from the client agent to the HTTP server. A GET request is part of the HTTP protocol used to make requests for information from an HTTP server. Each of which are known in the art and not described in detail here. This received data XML stream encoding new data is stored into the compatible partition 612 by creating a new file of data to import 724 or updating an existing file (Step 458c). For simplification for the purposes of this example, it is assumed that the received file is an XML file that represents the complete new state of the database, and that the received XML stream can overwrite any existing "new data to import" file 724. As workers having ordinary skill in the art will appreciate in light of the description provided here, further elaborations and enhancements may be provided including enhancements that provide additional logic and/or program code elements that allow the encoding of only data that is new or has changed rather than the entire data. As an error handling case that prevents the loss of data, the download of new data should desirably only proceed if the POST operation of Step 457 succeeds (Step 458d); if the POST operation does not succeed, the data synchronizer 714 should desirably terminate, then the system is free to shut down (Step 458e). At this point, the data upload and reception of new (or only changed) data is complete, and the system 200 is free to shut down (Step 458e).

At a later time, the primary operating system mode is started in conventional manner (Step 460), for example started manually by the user for his normal use of the system. The data publisher/subscriber program 710 is launched automatically (Step 461), for example, by the Windows NT service, as described in Step 451. The data publisher/subscriber performs the following tasks, which is an additional responsibility to that of Step 451. It reads the "new data to import" file 724 in the compatible partition 612 (Step 462). It then interprets the data within that file (for example the XML encoded data stream), assumed to be in the same format as that used in Step 451 for the converse data flow (Step 463), and generates updates to the local database 702 (Step 463). It was stated relative to Step 458, that as a simplification for the purposes of this description, the XML file encodes the complete state of the database (Step 464). Therefore, the database update process can be accomplished by clearing of previous state of the database and repopulating it with data interpreted from the XML file.

To prevent the program from unnecessarily repeating this operation, it can simply delete the "new data to import" file after it has integrated its data into the database (Step 465). When the data publisher/synchronizer program does not detect the existence of the "new data to import" file based on an arranged name and location, it does not proceed with this data integration step (Step 466). After the data publisher/synchronizer has performed its tasks (See Steps 451–466 generally), the new data received during appliance mode by the service is available to the user for use by his database system, such as the Access program (Step 467).

The integration of new data 705 into the local database 702 (See Step 451) can be accomplished for example, through ODBC interfaces accessing the Jet database driver. Open Database Connectivity (ODBC) is a standard Microsoft Win32 programming interface, and the Jet database driver is a component installed with Microsoft Access to make programmatic access to Access database available to other programs, each of which are known to workers having ordinary skill in the art.

The implementation of the structure and, method for generation and interpretation of XML, converting data to and from XML, are familiar to those skilled in the art, and not described in detail here. Extensible Markup Language (XML) is a format designed specifically for the ease of programmability of such implementations. (See for example "The XML Handbook" Second Edition, Charles F. Goldfarb and Paul Prescod, Prentice Hall PTR, Upper Saddle River, N.J. 07458 (http:www.phptr.com) ISBN-0-13-014714-1, herein incorporated by reference.)

There are additional enhancements to the basic methods that improve the security of the data transfer over the Internet by leveraging mechanisms that are standard in the HTTP-based technologies. For instance, Secure Socket Layer (SSL) is a standard way to make the interaction between the HTTP server and client, in our case the data synchronizer, private. HTTP Basic Authentication provides a way for the exchange of authentication information. Authentication information to be passed from the data synchronizer to the service may be stored as part of configuration information 720 mentioned in Step 455.

EXAMPLE APPLICATION No. 3

Data Push Triggered by an External Service

Figure 19:
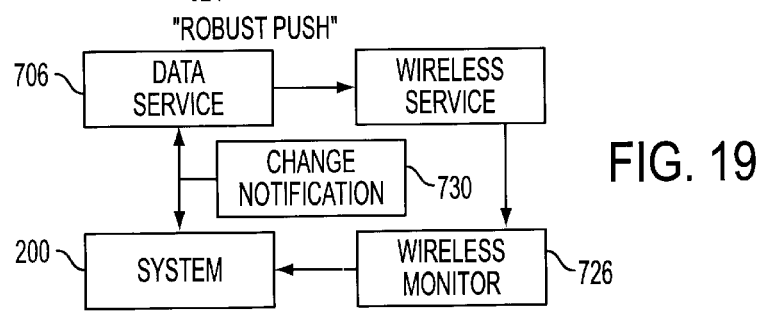
FIG. 19 is a diagrammatic illustration showing applicability of embodiments of the invention to content "push" technology on the Internet.

We next describe an additional embodiment of the inventive structure and method relative to FIG. 19 that provides an enhancement to above described data upload/download procedure which provides a way for the system 200 to support responding to a data push triggered externally by the publisher of the data or content, so called "push technology". Traditionally, systems that support what is called "push" of data from a data or content publisher to the subscriber only did so through the subscribing client fulfilling numerous execution assumptions. Examples of such assumptions include, for example, the subscriber frequently polling the data publisher for new data, or the subscriber running a live technical server program that was ready to receive data at any time the publisher choose to push the data to the subscriber.

The enhanced capability described here utilizes a new method and mechanism for monitoring of a notification that new data or other content is available, and it leverages the appliance mode dedicated data upload/download and transfer capabilities described above.

In addition to the structural and functional components already described, the system 200 is coupled to, or enhanced by the integral inclusion of a data reception device 726, preferably a wireless data reception device, such as a pager, telephone, or other device capable of receiving data. The data reception device may be either digital, analog, or hybrid analog/digital. The sequence of events for the fulfillment of a data-service-triggered push, utilizing the structures and general procedural methodology of the examples described previously, is now described.

The data service 706 publishes a change notification 730 (Step 470) to be sent out on the communication service, preferably a wireless service 731 compatible with the wireless data reception device 726. The data service mentioned here is merely exemplary and the term data service is intended to cover a broad range of mail, information, data, or other content provision services, for example it includes a mail post office service and the data service (described relative to the database example). In the case of the utilization of a wireless paging service where the wireless reception data device is a pager, this is a change notification 730 is directed at a single targeted user or user device. Conventional paging services provide for the request of a message to be initiated by an email to a special Internet-accessible email address associated with the target pager, so the specific realization may be a programmatically generated email to the email address associated with the target pager. Monitor functionality incorporated into the wireless pager, coupled to or part of the enhanced system, receives the change notification message 730 (Step 471).

Reception of the change notification message 730 triggers the start-up of the system in appliance mode (Step 472) and initiates a data reception activity (Step 473). This inventive structure could be applied to data reception activities such as the reception of mail or the download and upload of other contents and data. We have described the case of email download from a post office service and the download and upload of data from a database. One simple case involves the pager responding to any received pager message with one predetermined (possibly programmable) dedicated activity. An elaboration or enhancement to this approach involves the pager interpreting codes or other indicia in or of the received message and initiating one of a selection of potential appliance mode activities based on the contents of the received indicia of the message. Where codes or indicia are provided, digital messaging is most desirable, bur not required. For the purpose of this simple example, if the system is already on, in either the appliance mode operating system or in the primary operating system mode, the notification could simply be ignored with the justification or assumption that the already-executing system has the potential ability to be in touch with available network services as needed in its execution. Alternatively, receipt of the notification may trigger a different response, or permit the user to select the course of action. Those workers having ordinary skill in the art in light of the description provided here will appreciate that other enhancements, modifications, and elaborations to the embodiments already described are possible, such as where the notification message received by the pager are conveyed to an already-executing system through other means.

EXAMPLE APPLICATION No. 4

Dedicated Digital Audio Player

Figure 20:
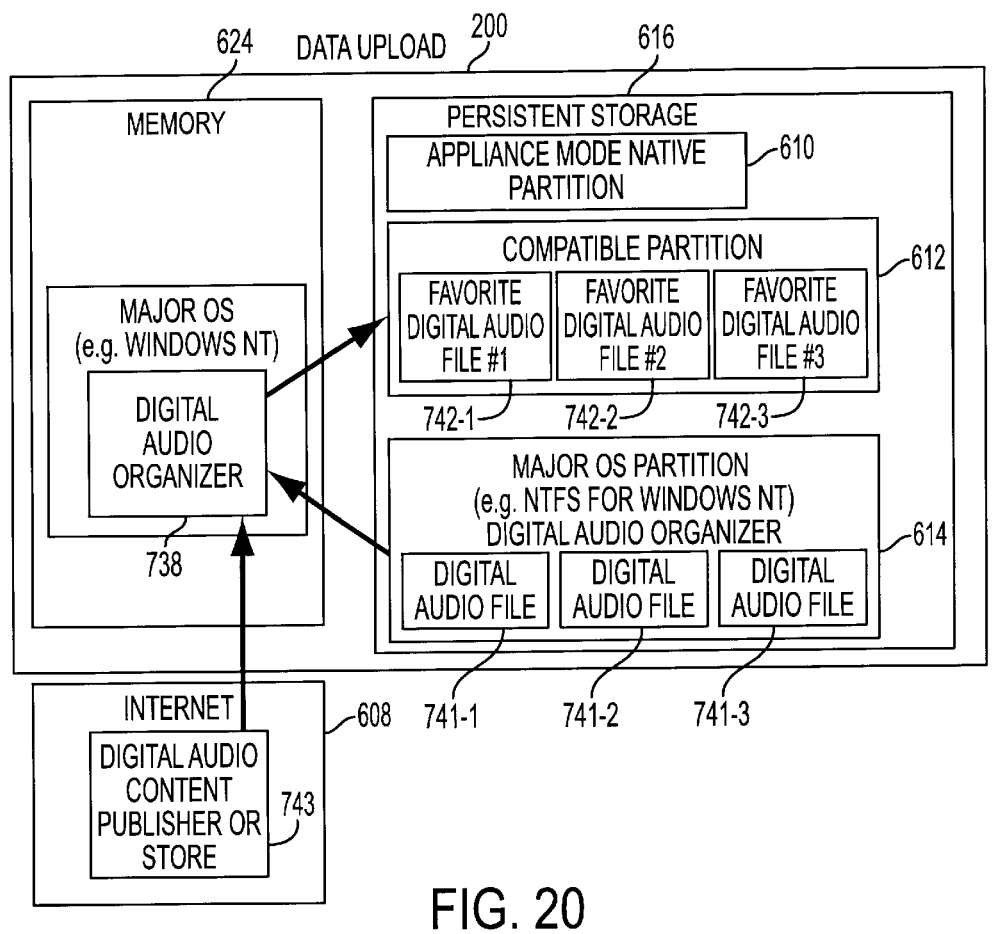
FIG. 20 is a diagrammatic illustration showing aspects of digital audio content download from the Internet (or a server or publisher connected to the Internet) or other source from a primary operating system and storage into a compatible storage device partition.
Figure 21:
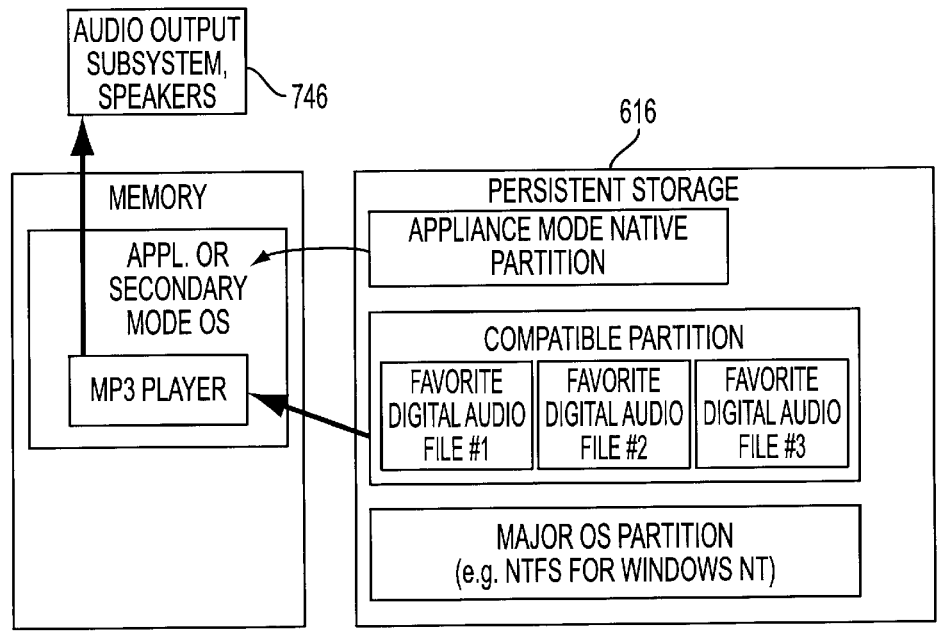
FIG. 21 is a diagrammatic illustration showing other aspects of digital audio content transfer from the compatible storage partition in FIG. 20 and access by a digital audio player, such as an MP3-type player, from an appliance mode application program.

We next describe a further embodiment of the inventive structure and method provides a user with convenient access to a prepared set of information, such as audio data encoded according to some digital audio data format, such as for example MP3, with respect to FIG. 20 and FIG. 21. For example, the inventive structure and method can be used to make the system useful as a digital audio player appliance. The general model for this embodiment is that of a full-featured digital audio management application which is used normally in the primary operating system mode of operation for general acquisition and management of digital audio content. This may include purchasing and downloading digital audio content from a digital audio content publisher or store 743 on the Internet 608 and organizing the content in files in the primary operating system environment. Such personal content management functionality may be part of the digital audio player product of the primary operating system mode.

This exemplary application assumes the presence of an enhancement to the digital audio organizer 738 of the primary operating system, or a separately added external tool, which provides functionality that allows the user 618 to choose any number of digital audio files and identify them as favorite digital audio files 742 (742-1, 742-2, 742-3, . . . , 742-n), where the selection of a digital audio file as a favorite causes the primary operating system program enhancement or external tool to create a copy of the files 741 from the primary partition 614 and place them into the compatible partition 612. For instance, in one embodiment it is a specific directory location where one or a number of uniquely named audio files is placed. This operation optionally but desirably also provides unique naming of the copy in the context of this special location, for instance by creating a name based on an increasing number sequence, or some other naming convention.

At a later time, when the system 200 is in the off state, and the user 618 wishes to listen to his favorite digital audio selections, he or she can do so by pressing a dedicated boot mode selector switch, as described generally in this document to enter the information appliance mode and listen to the digital audio selections 742. More specifically, the user initiates a dedicated boot to start the system in appliance mode (Step 481). The appliance mode operating system 630 is loaded in the system's memory 624 (Step 482), and the appliance mode operating system runs an automatic startup program 632 (Step 483). In this embodiment, this startup program may be the digital audio player program 744 such as an MP3 player, described in Step 486, or alternatively, it may be a dispatcher program. A dispatcher program would sense the launch configuration input (Step 484), described elsewhere in this document, and launch a second program (Step 485) based on the input. For this example, the dispatcher reads a configuration to execute the digital audio player. In one simple embodiment, the appliance mode digital audio player is one which creates a sequence of digital audio selections based on what it finds in the prepared directory location on the compatible partition, as described above. It plays the digital audio of the sequence one after the other (Step 486) using an audio output subsystem including speakers, headphones, or the like. The system is shut down manually by the user, interrupting the playback of the sequence, or the system shuts down automatically after the sequence is completed (Step 487).

One specific example of digital audio technology that may be implemented with the inventive structure and method is MP3, but other formats and protocols may equally well be supported as it is expected that standards for digital audio, digital video, and other multi-media content will evolve in the future. The implementation of an MP3 specific digital audio player in the appliance mode is not described in detail here as the MP3 standard, file structure, and other characteristics are known in the art. For purposes of playback, the system 200 would require an audio output subsystem 746 including for example audio device drivers, sound transducers such as speakers or headphones (or external speakers), and other logic to convert the digital information stored on the compatible partition to an audio signal, as is known in the art. Such an MP3 player plays back MP3 files 742 stored in persistent memory 616. The inventive structure and method synergistically integrate this component and its functionality into the system in a novel way and provides a new approach to the behavior of seeking a specified directory location for a prepared set of content to suit the described scenario.

Many elaborations of the digital audio player in the appliance mode are possible to enhance its convenience to the user. For instance, it can be made to take keyboard input to switch among the prepared favorites, to control volume, to pause the playback, and the like operations provided by other conventional audio players. Or a graphical display of the player could be added to provide a more natural control panel of functions. Alternatively, the design of the system hardware could be enhanced to provide dedicated controls for the initiation and control of the appliance-mode digital audio playback. The inventive structure and method advantageously enables the minimum of encumbrance in providing dedicated digital audio playback in such a system—for instance, not forcing the user to wait for the primary OS boot-up, not forcing the user to deal with dialogs and queries during the primary OS startup, and not forcing the user to find and launch the primary OS digital audio program. No doubt those workers having ordinary skill in the art will appreciate in light of the description provide here that numerous other additions and enhancements may be provided to add to the convenience to the user while maintaining the minimum of encumbrance as provided by the invention. While somewhat more complex, by providing appropriate video device drivers in the appliance mode operating system, video and audio-video may be stored and played back in similar manner. The system may additionally incorporate specialized hardware and firmware that is utilized specifically for digital audio playback and that interoperates with the stored files, yet minimizes the complexity of the appliance mode operating system and application program.

EXAMPLE APPLICATION No. 5

Dedicated Electronic Book (ebook) Player

The general structure and method described above for digital audio management and playback above is also applicable with modification to the management and playback of electronic books as well as other electronic content. An emerging format for electronic books, magazines, and other primarily textual content is the Open eBook standard "Open eBook Publication Structure 1.0". The intent of this standard is to accelerate the availability of reading material for electronic books and help ensure that consumers have access to reading materials from different publishers in a single, universal format. Open eBook Publication Structure 1.0 defines the format that content takes when it is converted from print to electronic form and is available from http://www.openebook.org as of 29 Feb. 2000, and hereby incorporated by reference. This electronic book enhancement is substantially a direct analogy to the digital audio playback system and method earlier described. Thus for this analogy "digital audio" becomes "electronic book", and "audio output subsystem including speakers, headphones, or the like" becomes "display and windowing subsystem". We expand on this structure and method immediately below.

With these analogies to the digital audio example in mind, the exemplary ebook application allows the user to choose any number of favorite electronic book files, where the selection of a particular electronic book file as a favorite causes creation of a copy of the ebook file in the compatible partition. For instance, in one embodiment it is a specific directory location where one or a number of uniquely named ebook files is placed. This location may be different than the location in which the favorite digital audio files were placed. This operation also provides unique naming of the copy in the context of this special location, for instance by creating a name based on an increasing number sequence or other criteria.

At a later time, when the system is in the off state, and the user wishes to read or view one of the favorite ebook selections, he or she can do so by hitting a dedicated boot mode selector and switch, as described generally in this document to enter the information appliance mode and then read or view the ebook selections. Drawings, artwork, photographs and albums, may be dealt with in the same manner as textual ebook selections. More specifically, the user initiates a dedicated boot to start the system in appliance mode (Step 491). The appliance mode operating system is loaded in the system's memory (Step 492), and the appliance mode operating system runs an automatic startup program (Step 493). This startup program may be the electronic book program agent program or alternatively, it may be a dispatcher program. A dispatcher program would sense the launch configuration input (Step 494), described elsewhere in this document, and launch a second program (Step 495) based on the input. For this example, the dispatcher reads a configuration to execute the ebook reader or player. In one simple embodiment, the appliance mode ebook player is one which creates a sequence of digital ebook selections based on what it finds in the prepared directory location on the compatible partition, as described above. It plays the ebook of one or more selections (Step 496) using a display and windowing subsystem. The system is shut down manually by the user, interrupting the playback of the sequence, or the system shuts down automatically after the sequence is completed (Step 497).

It will be clear to workers having ordinary skill in the art that features of the audio based digital audio capabilities, features of a digital video capabilities, and/or features of the electronic book capabilities provided by the inventive structure and method may be combined to provide a full multimedia experience, including audio, video, and text components. When a text-to-speech capability is provided in the appliance mode, the system may actually read the electronic book to the user thereby adding convenience to the system for the user.

Other enhancements of the electronic book player in the appliance mode are possible to enhance its convenience to the user. Again, the inventive structure and method advantageously enables the minimum of encumbrance in providing dedicated digital electronic book viewing and playback in the system, without forcing the user to wait for the primary operating system boot-up, not forcing the user to deal with dialogs and queries during the primary operating system startup, and not forcing the user to find and launch the primary operating system digital audio application program. Digital maps may advantageously be provided as a form of electronic book, whether conforming to the ebook standard or not, so that for mobile applications, the user may readily refer to maps stored in the compatible portion without the need to boot the primary operating system. Such map reading capability may also be combined with Global Positioning System (GPS) inputs so that fast reference to a current location may be made. No doubt those workers having ordinary skill in the art will appreciate in light of the description provide here that numerous other additions and enhancements may be provided to add to the convenience to the user while maintaining the minimum of encumbrance as provided by the invention.

EXAMPLE APPLICATION No. 6

Dedicated Data Acquisition

Figure 22:
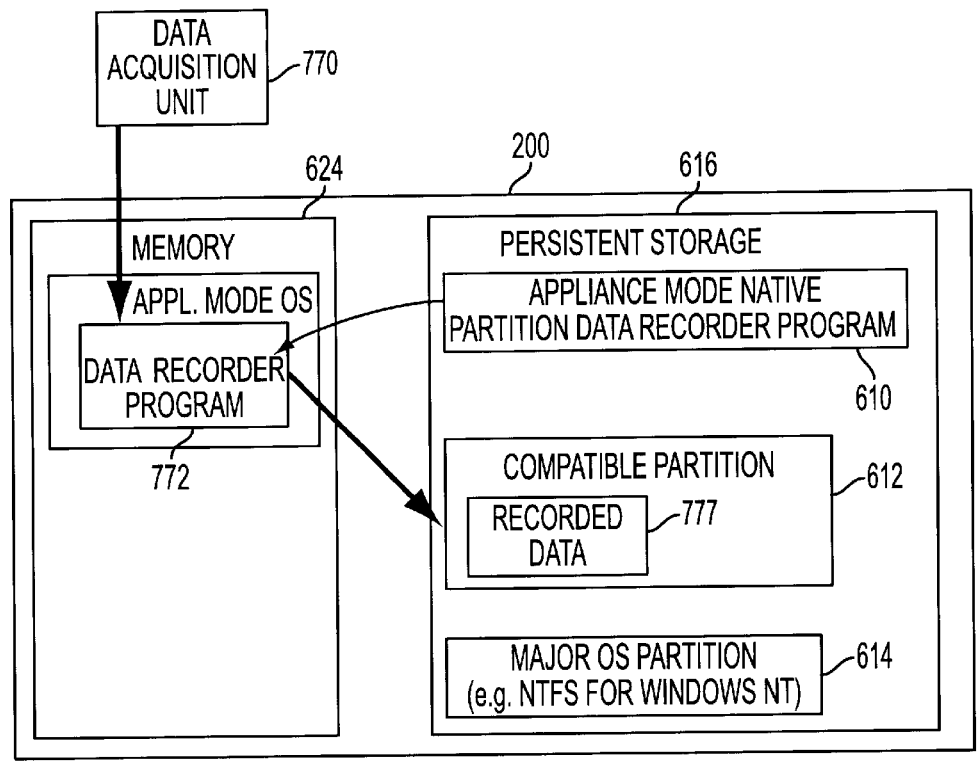
FIG. 22 is a diagrammatic illustration showing aspects of data acquisition from a data acquisition unit.
Figure 23:
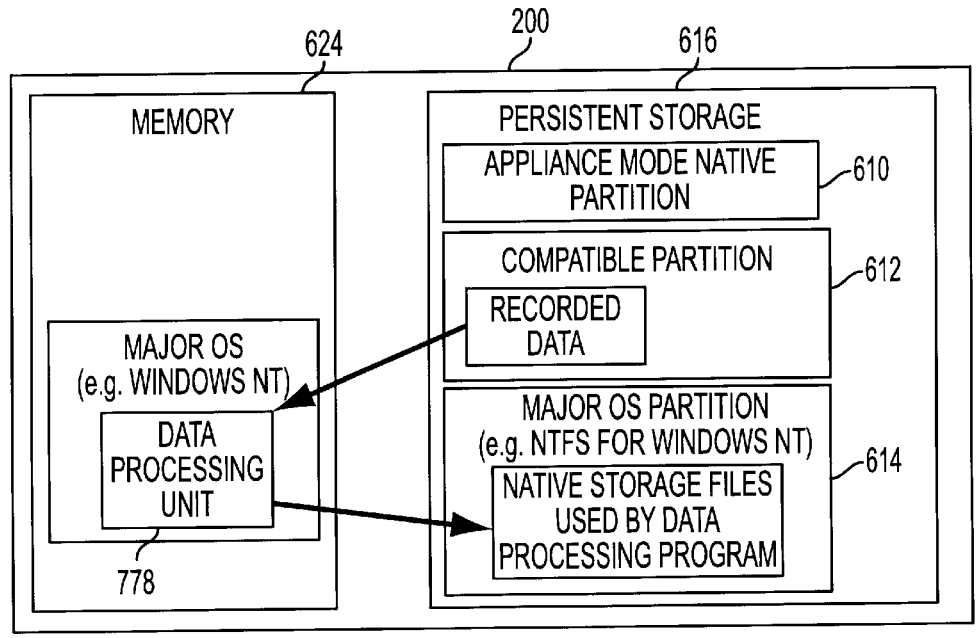
FIG. 23 is a diagrammatic illustration showing access of the data acquired in the FIG. 22 data acquisition unit and made available in a primary operating system mode for processing and/or analysis.

With reference to FIG. 22 and FIG. 23, an embodiment of the inventive structure and method where the appliance mode (secondary operating system mode) is used to collect information which is later processed when the system runs in the primary operating system mode. This is similar to the mail download example already described, except that it shows how the data collection could be through communication links and/or channels other than an Internet service.

In this embodiment, the system 200 is connected to a data acquisition device 770, to collect data on a predetermined basis. The predetermined basis may be periodic at particular time intervals, at particular scheduled times, conditional on the basis of the occurrence of an event, or according to any specified set of rules. For instance, the system 200 could be connected to a DT9802 analog-digital converter by Data Translation, which connects to a PC system through the Universal Serial Bus (USB). The analog-digital converter may, in turn, be connected to an analog voltage signal source where the signal produced by that source is dependent on the temperature, thereby making the unit provide a digital reading of the temperature.

Starting with the inventive system 200 in the off state, the inventive system and method can be made to automatically activate and acquire data from the data acquisition unit 770 and store the data reading as follows. The system is started in appliance mode (Step 501), using the timer-based and/or hardware control mechanisms described elsewhere in this document. The appliance mode operating system is loaded in the system's memory 624 (Step 502) and the appliance mode operating system runs an automatic startup program (Step 503). In this embodiment, this startup program may be the data recorder program 772 described in the next step (See Step 504). Alternatively, it may be a dispatcher program 774. A dispatcher program would sense the launch configuration input, described elsewhere in this document, and launch a second program based on the input. For this example, we assume that the dispatcher reads a configuration to execute a data recording activity. The data recorder program 772 is loaded from the appliance mode (secondary) partition 610 (Step 504). This program may read any necessary configuration information 775 from the appliance mode, such as configuration about what data channel of the data acquisition system to read. The data recorder program 772 communicates with the data acquisition unit 770 to cause it to make a reading and to receive its result (Step 505). For the case of the Universal Serial Bus (USB)-based unit mentioned above, this consists of the data recorder program 772 sending, receiving, and reacting to serial data bits over the USB bus and USB port. Of course where a USB port is used, the system would include USB physical port and connectors and operating system drivers to support reading from the USB port. The details of the data acquisition protocol are not described here, as they are part of the defined behavior of the data acquisition unit such as the one mentioned and known by workers having ordinary skill in the art. The reading or readings, one or a set of numbers, symbols, or other indicators, are then written into a recorded data file 777 in the compatible partition, either by creating a new file or appending to an existing file (Step 506). The encoding, for example, could be ASCII in comma-delimited form or in any other form. Then, the system is then free to shut down (Step 507).

Steps 501–507 are repeated until the next usage of the system 200 by the user in the primary operating system mode. In that primary operating system mode, such as a Microsoft Windows NT, Microsoft Windows 2000, UNIX, or the like operating system mode, the user can make use of the captured data placed in the recorded data file 777 as follows. The user boots the system 200 into the primary operating system mode (Step 508), and then launches a data processing program 778 (Step 509). The data processing program 778 reads the recorded data file 777 that was written by the data recorder program 772 in appliance mode (Step 510). The recorded data collected while in the appliance mode can thereby get in the active memory 624 of the primary operating system mode program for whatever processing that is necessary, such as numerical analysis or encoding for saving in the primary operating system partition, or delivery to another processing entity. The data processing program 778, after consuming the contents of the recorded data file 777, may either retain the file or delete the file as a way to record its consumption of the contents (Step 511).

As a further enhancement to this embodiment, it is noted that a data acquisition unit such as the Data Translation DT9802 is capable of generating an analog signal as well as reading one. Therefore, the inventive structure and method also provide the ability to execute a program while in the appliance mode, which we will call a controller program 779, which drives the DT9802 to generate analog signals to control external processes, such as external machinery 780. The sequence of analog signals generated by the controller program 779 may also be driven by data files stored by the system in the compatible partition while in primary operating system mode. For instance, in one case, a data file may be stored in the compatible partition which consists of comma-separated ASCII encoded voltage values, specifying a voltage to output to one channel on every timed execution of the appliance mode. The controller program may consume one number in the file and rewrite the file omitting that number for the next execution of the appliance.

EXAMPLE APPLICATION No. 7

Computer Diagnosis, Maintenance and Repair

Computer maintenance, diagnostics, and repair/recovery procedures may also benefit from the inventive structure and method utilizing the secondary operating system in the manner already described. When a second operating system is available on a separate partition from the primary partition, the hardware is usable so that diagnostics or repairs may readily be made to the primary operating system.

In one embodiment, a computer or information appliance manufacturer pre-configures the computer or information appliance with the second partition and secondary operating system so that the secondary operating system can be utilized when the primary operating system is damaged or becomes unstable in some way. Diagnostic and possible repair programs may be run from the second undamaged environment of the secondary operating system. Virus control is a good special case of capability as well, the secondary operating system and storage can be prevented from contracting a virus by preventing the primary operating system from access to the secondary partition.

More specifically, a computer or information appliance manufacturer provides a design having a special "SOS" (Help) button that causes a boot into the secondary operating system mode in the event that trouble is encountered or failure has occurred. This action begins a diagnostic and repair sequence that includes running diagnostics, and instructions to the user on how to connect the computer or information appliance to a communications network (for example, by connecting a phone line, or making sure that the LAN is connected), so that the computer or information appliance can interact with a diagnostic and repair (or anti-virus) service.

In the case where the computer or information appliance includes removable memory, such as a PC card product, the PC card product or other removable memory is created which contains the secondary operating system and diagnostic and repair applications. This PC card could be plugged into a computer or information appliance (for example, notebook computers typically provide several PC card slots) as needed to do a diagnostic or repair, and even when the computer's primary operating system is in a nonbootable state. This embodiment eliminates the need for the manufacturer to pre-configure the computer with the secondary operating system, though the PC card or other removable memory approach may be used with a pre-configured computer as well.

The PC card (or other removable memory device) may advantageously be designed in conjunction with the particular software and/or hardware configuration of the computer or information appliance, so that it can be easily used without the user needing to do driver installation and configuration just to be able to use this PC card—because by the time it is used, the computer or information appliance may not be in a sufficiently stable state to perform such a configuration. For example, in a preferred embodiment, the computer or information appliance is specifically designed to check, on every boot, for the availability of this specific kind of diagnostic card or memory device, and choose to boot from it instead of its normal boot path if it finds it. In this way, should the primary operating system be unbootable, the system would automatically boot to the PC card secondary operating system.

A further enhancement to this configuration would also optionally combine a modem or network adapter with the PC card containing the secondary operating system so that an all-in-one plug-in addition to the system checks and interacts with the network as needed to perform the diagnostics and repairs.

In still another embodiment, the secondary operating system and partition are used as a means to perform large-scale software changes (for example, repairs, upgrades, installations, replacements) on the computer or information appliance. The fact that the secondary operating system allows the computer hardware to operate independently of the existence and configuration of the primary operating system means that it can perform arbitrary changes to the primary operating system and configuration. For instance, a computer manufacturer could ship the computer with only the secondary partition configured and the computer would then, upon its first boot, instruct the user on how to connect the computer to a network to download the primary operating system, application software, and configuration information. One benefit of this is that it would allow the computer manufacturer to ship or otherwise provide the absolute latest operating system to customers, including any patches, service releases, or the like that have been issued since the computer was built. Another benefit is that it facilitates mass customization of the primary operating system and applications, according to the customer's immediate needs. It also facilitates new models of primary operating system licensing, such as renting or leasing the primary operating system for a predetermined period of time or number of hours of use and managed or enforced by the secondary operating system.

One difference in this application as compared to some of the earlier described applications for the appliance mode operation, is that the secondary operating system explicitly has the ability to read the primary storage region or partition. In embodiments of this application, the primary operating system is not able to read the secondary storage region, but such a limitation, though advantageous in some situations, is not required.

Additional Description

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

All publications and patent applications cited in this specification are herein incorporated by reference as if each individual publication or patent application were specifically and individually indicated to be incorporated by reference.

We claim:

1. A method for performing service on an information appliance capable of receiving a removable memory device, said method comprising steps of:

providing a primary operating system on a first storage device partition;

providing a secondary operating system on a second storage device partition different from said first partition;

upon each boot operation, checking for a presence of said removable memory device and preferentially booting from said removable memory device if its presence is detected;

if said primary operating system requires service, then operating said information appliance with said secondary operating system; and performing a service procedure to said primary operating system or to software or hardware operable with said primary operating system while operating under said secondary operating system.

2. The method in claim 1, wherein said information appliance comprises a computer having a processor and a memory coupled to said processor, and at least one storage device on which at least one of said first and second storage device partitions are defined.

3. The method in claim 1, wherein said first storage device partition and said second storage device partitions are defined on the same physical storage device.

4. The method in claim 1, wherein said first storage device partition and said second storage device partitions are defined on different physical storage devices.

5. The method in claim 1, wherein said information appliance is a personal computer.

6. The method in claim 1, wherein said information appliance is selected from the group of consisting of a desktop personal computer, a notebook computer, a personal data assistant, a mobile telephone, a cellular telephone, a home appliance, an information kiosk, a data collection instrument, a device containing a processor coupled to a memory.

7. The method in claim 1, wherein said service procedure is selected from the group consisting of a maintenance procedure, a diagnostic procedure, a repair procedure, a recovery procedure, and combinations thereof.

8. The method in claim 1, wherein said service comprises a service to said primary operating system.

9. The method in claim 1, wherein said method further comprises the step of:

pre-configuring said information appliance with second partition and with said secondary operating system before a service event is needed so that said secondary operating system can be utilized when the primary operating system is serviced without requiring loading of said secondary operating system.

10. The method in claim 1, wherein said method further comprises the step of:
pre-configuring said information appliance with second partition and with said secondary operating system during manufacture of said information appliance so that said secondary operating system can be utilized at any later time when the primary operating system is serviced without requiring loading of said secondary operating system.

11. The method in claim 9, wherein said service event comprises said primary operating system becoming damaged or unstable.

12. The method in claim 1, wherein said service procedure comprises a diagnostic application program executed by said information appliance while operating in said secondary operating system environment.

13. The method in claim 1, wherein said service procedure comprises an operating system repair application program executed by said information appliance while operating in said secondary operating system environment.

14. The method in claim 1, wherein said service procedure comprises an operating system reload application program executed by said information appliance while operating in said secondary operating system environment.

15. The method in claim 1, wherein said service procedure comprises connecting said information appliance to a remote diagnostic or repair facility for diagnosis or repair.

16. The method in claim 1, wherein said service procedure comprises connecting said information appliance to a remote service facility for diagnosis, repair, or reinstallation of said primary operating system or components thereof.

17. The method in claim 16, wherein said remote service facility is connected to via an internet communication link.

18. The method in claim 1, wherein said service procedure is executed from the second undamaged operating system environment.

19. The method in claim 1, wherein said secondary operating system and said secondary partition are protected from access by said primary operating system and applications programs executing therein.

20. The method in claim 19, wherein said protection includes protection from access by a computer virus infecting said first partition.

21. The method in claim 1, wherein said information appliance further comprises a boot control device, and said method further comprises receiving a boot control signal from said boot control device that results in a boot into said secondary operating system.

22. The method in claim 21, wherein said boot control device includes a storage for storing a boot control value, and said received boot control signal comprises said boot control value or a signal representation of said boot control value.

23. The method in claim 21, wherein said boot control device comprises a switch generating a signal received by a processor within said information appliance to initiate a boot into said secondary operating system.

24. The method in claim 22, wherein said switch is activated by a user of said information appliance upon recognizing a problem with said information appliance.

25. The method in claim 22, wherein said switch is automatically actuated by said information appliance upon recognizing a possible primary operating system or primary partition service situation based upon predetermined criteria.

26. The method in claim 22, wherein said primary operating system sets said boot control value into said secondary operating system when it detects a predetermined situation based on predetermined criteria.

27. The method in claim 26, wherein said boot control value is stored into a storage location accessible to said secondary operating system during a boot operation and permits initiation of a service operation.

28. The method in claim 27, wherein said boot control value is selected from a plurality of possible boot control values, each said possible boot control value being associated with a particular service operation.

29. The method in claim 1, wherein said method further includes displaying instructions to the user via a display associated with said information appliance to instruct said user as to how to service the information appliance to eliminate the problem.

30. The method in claim 29, wherein said displayed instructions include instructions as to how the user should connect said information appliance to a communications network so that the information appliance can interact with a remote service.

31. The method in claim 30, wherein said communications network is selected from the group consisting of a local area network (LAN), a wide area network (WAN), a service computer coupled by telephone lines, the internet, and combinations thereof.

32. The method in claim 26, wherein said service comprises an anti-virus service for removing viruses from said information appliance.

33. The method in claim 1, wherein a backup copy of said primary partition is stored at a remote site and said service procedure further comprises connecting to said remote site and restoring an undamaged version of programs and data from said backup copy.

34. The method in claim 1, wherein said information appliance includes means for receiving the removable memory device.

35. The method in claim 1, wherein said removable memory device comprises a solid state memory device.

36. The method in claim 1, wherein said removable memory device comprises a rotatable memory storage device.

37. The method in claim 35, wherein said solid-state memory device is selected from the group consisting of a flash memory device, a powered RAM memory device, a PC card memory product, a ROM memory, a Sony Memory Stick memory device, and combinations thereof.

38. The method in claim 1, wherein said removable memory device contains said secondary operating system and diagnostic and repair application programs.

39. The method in claim 1, wherein said removable memory device is plugged into said information appliance when needed to perform a diagnostic, maintenance, or repair operation.

40. The method in claim 1, wherein said removable memory device is plugged into said information appliance when said primary operating system is not operable to boot said information appliance.

41. The method in claims 1, wherein said memory device comprises a PC card device having a memory device therein and said PC card is plugged into a PC card slot when said service is desired.

42. The method in claim 1, wherein said information appliance is adapted to receive said removable memory device at any time so that pre-configuration of said information appliance to have a second partition and a secondary operating system on said secondary partition is not required.

43. The method in claim 1, wherein said information appliance includes a driver for interacting with said removable memory device so that said removable memory device and said secondary operating system and applications programs stored thereupon are recognized and usable without further driver installation or configuration.

44. The method in claim 43, wherein said driver for interacting with said removable memory device is provided with a basic input/output system (BIOS) of said information appliance.

45. The method in claim 44, wherein said BIOS provided with said information appliance provides means for automatically loading necessary drivers from storage necessary for operation of said secondary operating system.

46. The method in claim 1, wherein said removable memory device is provided within a PC card device and said PC card device further comprises a communication device selected from the group consisting of a modem, a network adapter, and combinations thereof; said PC card providing an all-in-one addition to said information appliance system that provides diagnostics and network connectivity and interaction to perform said service.

47. The method in claim 1, wherein said service procedure comprises performing a software change.

48. The method in claim 47, wherein said software change comprises a change to a software item selected from the group consisting of an operating system software item, an application program software item, a device driver software item, a BIOS software item, a user interface software item, an internet browser software item, and combinations thereof.

49. The method in claim 47, wherein said software change comprises a software change selected from the group consisting of a software repair, a software upgrade from an older version to a newer version, a software upload, a software download, a software replacement, a software installation, a software patch, and combinations thereof.

50. The method in claim 1, wherein provision of said secondary operating system allows hardware circuits and devices within or communicating with said information appliance to operate substantially independently of the existence and configuration of said primary operating system so that said secondary operating system and procedures executing within said secondary operating system environment can make arbitrary changes to said primary operating system and configuration without adverse consequence to the operation of said information appliance.

51. The method in claim 1, wherein:
said primary operating system is a primary operating system selected from the group consisting of Microsoft Windows 3.x, Microsoft Windows 95, Microsoft Windows 98, Microsoft Windows Millennium Edition, Microsoft Windows 2000, Microsoft Windows 2000 Professional, Microsoft Windows NT 3.x, Microsoft Windows NT 4.x, Solaris, Linux, Unix, MacOS; and
said secondary operating system is a secondary operating system selected from the group consisting of Linux, Unix, Microsoft Windows CE, Microsoft NT Embedded Edition, Microsoft Windows NT, Microsoft Windows 98, Microsoft Windows 2000, Microsoft Windows Millennium Edition, Wind River VxWorks, Palm OS, and DR-DOS;
said secondary operating system selected to be either a different operating system than said primary operating system or a differently configured version of said primary operating system.

52. A method for performing service on a computer capable of receiving a removable memory device, comprising:
providing a primary operating system on a first storage device partition;
providing a secondary operating system on a second storage device partition different from said first partition;
if said primary operating system requires service, then operating said computer with said secondary operating system; and
performing a service procedure to said primary operating system or to software or hardware operable with said primary operating system while operating under said secondary operating system, and
wherein said removable memory device comprises a hard disk drive different from a hard disk drive internal to said computer and storing said primary operating system.

53. A method for performing service on a computer having means for receiving a removable memory device, comprising:
providing a primary operating system on a first storage device partition;
providing a secondary operating system on a second storage device partition different from said first partition;
if said primary operating system requires service, then operating said computer with said secondary operating system; and
performing a service procedure to said primary operating system or to software or hardware operable with said primary operating system while operating under said secondary operating system, and
wherein said means for receiving said removable memory device comprises a receptacle having an opening onto an exterior surface of said computer for inserting the removable memory device and a plurality of electrical contacts disposed on or extending into said receptacle for contacting mating contacts on said memory device when said memory device is inserted into said receptacle.

54. An information appliance comprising:
a processor;
a memory coupled to said processor;
at least one storage device on which a first partition is defined;
a primary operating system stored on the first partition;
a portable non-volatile memory device having a plurality of electrical contacts disposed on an external surface thereof for coupling to an electrical circuit of said information appliance;
second operating system for said information appliance stored within said non-volatile memory;
a controller for controlling said information appliance to operate under the secondary operating system under predetermined conditions that include performing a service procedure to the first operating system and/or to software and/or hardware associated with the information appliance; and
security means controlling access to said stored primary operating system only with authorization.

55. A method for performing service on computer, said method comprising steps of:
providing a primary operating system on a first storage device partition;
providing a secondary operating system on a second storage device partition different from said first partition;

if said primary operating system requires service, then operating said computer with said secondary operating system; and performing a service procedure to said first operating system or to software or hardware operable with said first operating system while operating under said second operating system;

said service procedure including a procedure for loading software onto said information appliance and comprising steps of:

defining a first partition on a storage device of said computer;

defining a second partition different from said first partition;

installing a secondary operating system and a computer program on said second partition; and executing said computer program code while operating in said secondary operating system, said computer program code being operative to load a primary operating system onto said first partition from an external source.

56. A method for loading software onto an information appliance, said method comprising steps of:

defining a first partition on a storage device of said information appliance;

defining a second partition different from said first partition;

installing a secondary operating system and a computer program on said second partition; and executing said computer program code while operating in said secondary operating system, said computer program code being operative to permit a user to select a particular primary operating system from a plurality of available operating systems and to load the primary operating system onto said first partition from an external source.

57. A method for loading software onto a computer, comprising:

defining a first partition on a storage device of said computer;

defining a second partition different from said first partition;

installing a secondary operating system and a computer program on said second partition; and executing said computer program code while operating in said secondary operating system, said computer program code being operative to download a primary operating system from the external source once connected, and to install and configure said primary operating system onto said first partition.

58. The method in claim 56, wherein said computer program further downloads at least one application program for said primary operating system.

59. The method in claim 56, whereby said primary operating system is a latest version of said primary operating system including operating system patches and service releases made available between the date said information appliance was manufactured and the date said operating system is downloaded.

60. The method in claim 57, wherein said downloaded primary operating system is downloaded only upon payment of a fee.

61. The method in claim 60, wherein said fee is a fee selected from the group consisting of a purchase fee, a rental fee, a lease fee, and a licensing fee.

62. The method in claim 57, wherein said downloaded primary operating system is licensed for a determinate period of time for a determinate licensing fee.

63. The method in claim 62, wherein said method further comprises monitoring of use of said downloaded primary operating system and enforce licensing provisions including a license expiration date of said downloaded operating system.

64. The method in claim 57, further comprising the step of monitoring use of said downloaded operating system for compliance with license use conditions.

65. The method in claim 64, wherein said monitoring comprises executing computer program code that executes in the background within said primary operating system.

66. The method in claim 64, wherein said monitoring comprises executing application program logic during a start-up operation.

67. The method in claim 66, wherein said application program logic executes within said primary operating system.

68. The method in claim 64, wherein said monitoring includes executing monitoring computer program code that causes a boot control to be set so that the operating system boots into said secondary operating system for a service operation to thereby enforce a licensing condition during a predetermined subsequent boot operation.

69. The method in claim 68, wherein said subsequent boot is a next boot operation.

70. The method in claim 64, wherein said monitoring causes a system restart after a predetermined amount of time over the amount of time allowed by said license.

71. The method in claim 64, wherein said monitoring is performed by the secondary operating system or a program module executing within said secondary operating system.

72. The method in claim 64, including periodically booting into said secondary operating system to perform said monitoring.

73. The method in claim 64, wherein said primary operating system periodically causes a boot into said secondary operating system to perform said monitoring.

74. The method in claim 64, wherein said monitoring includes the step of executing computer program code to provide security features to diminish the probability that a user can tamper with said licensing provisions.

75. The method in claim 74, wherein said security features are selected from the group comprising encryption, password, user identification, operating system serial number or identification, computer serial number or identification, user account number, and combinations thereof.

76. A method for loading software onto a computer, comprising:

defining a first partition on a storage device of said computer;

defining a second partition different from said first partition;

installing a secondary operating system and a computer program on said second partition; and executing said computer program code while operating in said secondary operating system, said computer program code being operative to load a primary operating system onto said first partition from an external source, and wherein a purchaser of said computer is able to select and customize the primary operating system according to the purchaser's needs.

77. The method of claim 52 wherein the computer includes means for receiving the removable memory device.

* * * * *

UNITED STATES PATENT AND TRADEMARK OFFICE
CERTIFICATE OF CORRECTION

PATENT NO. : 6,763,458 B1
DATED : July 13, 2004
INVENTOR(S) : Royji Watanabe et al.

It is certified that error appears in the above-identified patent and that said Letters Patent is hereby corrected as shown below:

Column 6,
Line 55, "with" should be -- within --;

Column 7,
Line 29, "acing" should be -- accessing --;

Column 11,
Line 18, "ro" should be -- to --.

Signed and Sealed this

Fourth Day of October, 2005

JON W. DUDAS
*Director of the United States Patent and Trademark Office*